US010545506B2

United States Patent
Nariyambut Murali et al.

(10) Patent No.: US 10,545,506 B2
(45) Date of Patent: Jan. 28, 2020

(54) METHODS AND APPARATUS TO PERFORM VISUAL ODOMETRY USING A VEHICLE CAMERA SYSTEM

(71) Applicant: Ford Global Technologies, LLC, Dearborn, MI (US)

(72) Inventors: Vidya Nariyambut Murali, Sunnyvale, CA (US); Bruno Sielly Jales Costa, Sunnyvale, CA (US); Binduhasini Sairamesh, Sunnyvale, CA (US); Nikhil Nagraj Rao, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 30 days.

(21) Appl. No.: 15/897,013

(22) Filed: Feb. 14, 2018

(65) Prior Publication Data

US 2019/0250631 A1 Aug. 15, 2019

(51) Int. Cl.
*G06K 9/00* (2006.01)
*G05D 1/02* (2006.01)
*G06T 7/246* (2017.01)

(52) U.S. Cl.
CPC ........... *G05D 1/0253* (2013.01); *G06T 7/246* (2017.01); *G06T 2207/30248* (2013.01)

(58) Field of Classification Search
CPC .................................................. G05D 1/0253
USPC ........................................................ 382/103
See application file for complete search history.

(56) References Cited

U.S. PATENT DOCUMENTS

| 8,725,413 B2 | 5/2014 | Kozak et al. |
| 2004/0221790 A1 | 11/2004 | Sinclair et al. |
| 2006/0095172 A1 | 5/2006 | Abramovitch et al. |
| 2016/0280216 A1* | 9/2016 | Douki .................. B60W 10/08 |
| 2019/0066522 A1* | 2/2019 | Sweet, III ............. G01S 13/913 |

FOREIGN PATENT DOCUMENTS

| EP | 3009789 | 4/2016 |
| EP | 3057061 | 8/2017 |

OTHER PUBLICATIONS

Van Hamme et al., Robust Monocular Visual Odometry for Road Vehicles Using Uncertain Perspective Projection, EURASIP Journal on Image and Video Processing, (2015), 21 pages.

* cited by examiner

Primary Examiner — Stephen P Coleman
(74) Attorney, Agent, or Firm — Raymond L. Coppiellie; Hanley, Flight & Zimmerman, LLC

(57) ABSTRACT

Methods, apparatus, systems, and articles of manufacture are disclosed to perform visual odometry using a monocular camera. An example apparatus includes a method fusioner to determine a visual odometry method using a surface characterization to calculate first odometry data, a displacement determiner to calculate second odometry data based on sensor information, an odometry calculator to calculate an odometry parameter of a target object with respect to a vehicle based on the first and the second odometry data, and a vehicle command generator to generate a vehicle command based on the odometry parameter.

20 Claims, 10 Drawing Sheets

METHODS AND APPARATUS TO PERFORM VISUAL ODOMETRY USING A VEHICLE CAMERA SYSTEM

FIELD OF THE DISCLOSURE

This disclosure relates generally to vehicles and, more particularly, to methods and apparatus to perform visual odometry using a vehicle camera system.

BACKGROUND

Vehicles, such as cars and trucks, typically include a camera system including one or more cameras to capture images or live feeds of the vehicles' surroundings. Drivers can use the onboard camera system to perform a vehicle maneuver such as parallel parking. In some instances, autonomous vehicles can use the onboard camera system to direct, guide, or otherwise move the vehicle.

SUMMARY

An example apparatus includes a method fusioner to determine a visual odometry method using a surface characterization to calculate first odometry data, a displacement determiner to calculate second odometry data based on sensor information, an odometry calculator to calculate an odometry parameter of a target object with respect to a vehicle based on the first and the second odometry data, and a vehicle command generator to generate a vehicle command based on the odometry parameter.

An example method includes determining a visual odometry method based on characterizing a surface to calculate first odometry data, calculating second odometry data based on sensor information, calculating an odometry parameter of a target object with respect to a vehicle based on the first and the second odometry data, and generating a vehicle command based on the odometry parameter.

An example non-transitory computer readable storage medium comprising instructions which, when executed, cause a machine to at least determine a visual odometry method based on characterizing a surface to calculate first odometry data, calculate second odometry data based on sensor information, calculate an odometry parameter of a target object with respect to a vehicle based on the first and the second odometry data, and generate a vehicle command based on the odometry parameter.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
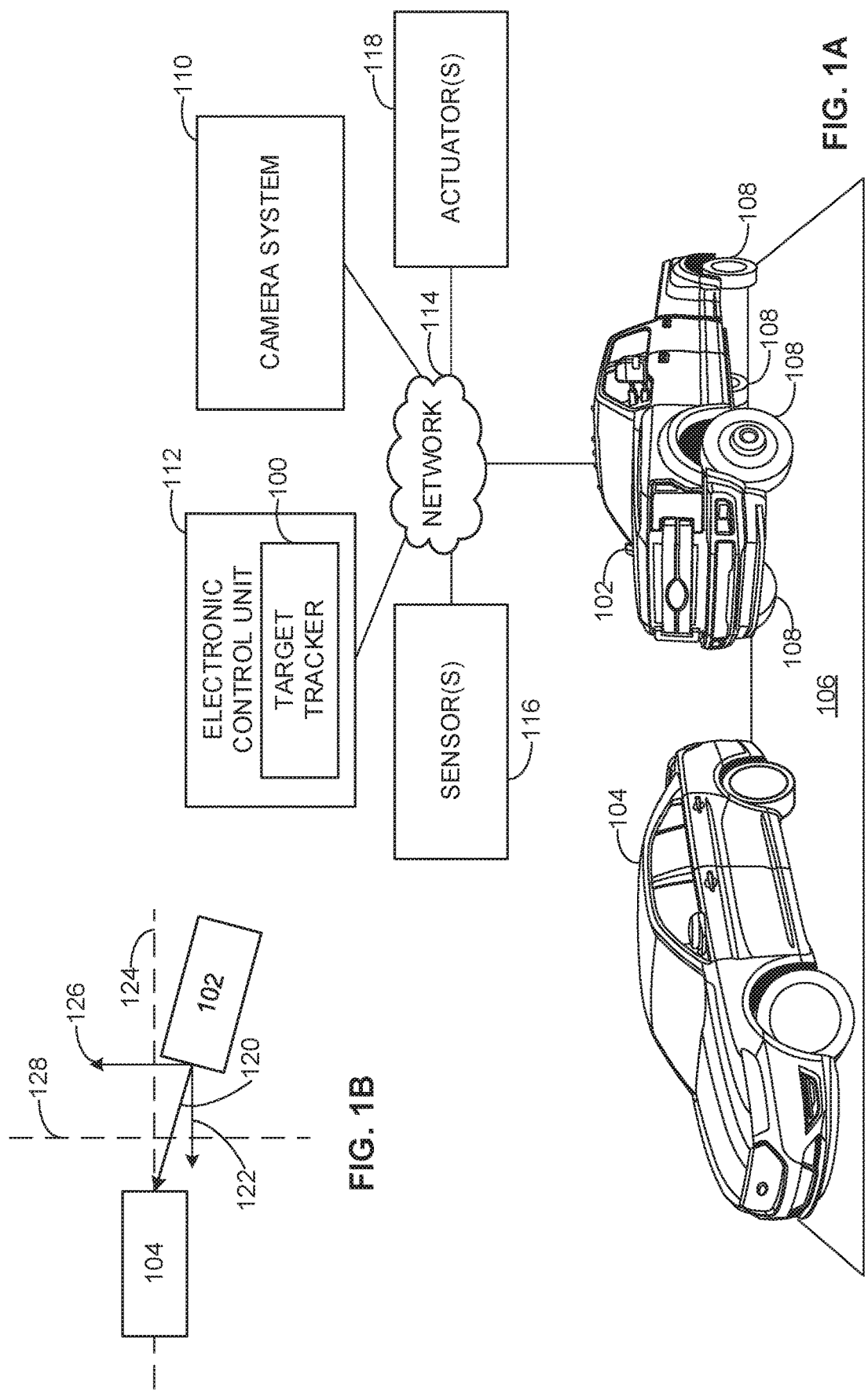
FIG. 1A illustrates an example vehicle that may implement an example target tracker apparatus disclosed herein.
FIG. 1B illustrates the example vehicle of FIG. 1A performing a vehicle maneuver based on a vehicle command generated by the example target tracker apparatus of FIG. 1A.

Drivers may use a vehicle camera system including a front-facing camera system, a rear-view camera system (e.g., a backup camera system), and/or a side-view camera system to perform a vehicle maneuver such as moving forward on a road surface, making a turn on the road surface, backing up into a parking space, etc. In some instances, an autonomous vehicle uses the front-facing camera system and/or the side-view camera system to adjust a direction and/or a speed of the vehicle in relation to object(s) or vehicle(s) in front of or on the side of the vehicle. In some instances, an autonomous vehicle uses the backup camera system to perform a vehicle maneuver (e.g., an autonomous vehicle maneuver) in relation to an object such as backing up towards another object or vehicle. Typical backup camera systems include a single camera (e.g., a monocular camera), to capture an image or a live feed of the surroundings behind the vehicle. Typical front-facing camera systems and/or side-view camera systems include one or more cameras to capture images or live feeds of the surroundings in front of and/or on the side of the vehicle.

Accurate tracking of a target, or a target object, (e.g., a traffic light, a stop sign, a pedestrian, a vehicle, etc.) for a vehicle maneuver (e.g., merging onto a highway, making a turn, etc.) requires robust estimation of characteristics corresponding to the target such as height, lateral distance, longitudinal distance, etc. In some examples, using a backup camera system including a monocular camera produces complex challenges for estimating the target characteristics because of a lack of depth information that results from using a single camera image generated by the monocular camera. Similar challenges exist for front-facing camera systems deployed for autonomous vehicles in localization, mapping, and/or simultaneous localization and mapping (SLAM) applications.

Example target tracker apparatus disclosed herein relate to vehicles and, more particularly, to performing visual odometry using a vehicle camera system. In general, the example target tracker apparatus disclosed herein utilizes an electronic control unit (ECU) or controller to obtain vehicle sensor information and camera system information to improve estimating target characteristics when depth information is not available. As used herein, the term "electronic control unit" refers to an embedded controller or system that monitors and/or controls one or more components (e.g., electrical, mechanical, etc.), electrical subsystems, electrical systems, etc. of a vehicle.

In some disclosed examples, the target tracker apparatus of a vehicle determines odometry parameters corresponding to a target object with respect to the vehicle by obtaining and/or processing vehicle sensor information. As used herein, the terms "sensor information" and "vehicle sensor information" are used interchangeably and refer to data obtained from a sensor monitoring a vehicle or a vehicle system such as a light sensor, a moisture sensor, a speed sensor, a steering wheel angle sensor, a torque sensor, etc. In some examples, the vehicle sensor information corresponds to a status of an actuator operating on the vehicle such as a brake actuator, a valve actuator, a windshield wiper actuator, etc. In some examples, the vehicle sensor information includes data obtained from an ECU such as a speed of the vehicle, a status of an anti-lock brake system component, global positioning system (GPS) information, etc.

In some examples, the target tracker apparatus uses an Ackermann odometry method to determine displacement information corresponding to a change in a position of a vehicle relative to a target object (e.g., a moving object, a stationary object, etc.) over time using vehicle sensor information. In some examples, the target tracker apparatus uses the Ackermann odometry method to calculate one or more odometry parameters including a lateral displacement, a longitudinal displacement, a pose, etc., of the target object with respect to the vehicle. In some examples, the target tracker apparatus obtains vehicle sensor information such as vehicle speed and steering wheel angle information from an ECU via a controller area network (CAN) bus. For example, the target tracker apparatus may integrate the vehicle speed values over time and use Ackermann geometry to determine displacement information.

In some disclosed examples, the target tracker apparatus of a vehicle determines odometry parameters corresponding to a target object with respect to the vehicle by obtaining and/or processing camera system information. As used herein, the term "camera system information" refers to data corresponding to an image captured by one or more cameras included in a vehicle camera system. For example, the camera system information may include one or more images, digital data corresponding to the one or more images, a streaming video feed, data corresponding to the streaming video feed, etc. As used herein, the term "vehicle camera system" refers to one or more camera systems of a vehicle including one or more cameras and/or one or more processors. For example, a vehicle camera system may include a backup camera system including one or more cameras and/or one or more processors, a side-view camera system including one or more cameras and/or one or more processors (e.g., one or more cameras disposed on one or both sides of the vehicle), a front-facing camera system including one or more cameras and/or one or more processors (e.g., one or more cameras facing in a direction of forward travel of the vehicle), etc., and/or a combination thereof.

In some examples disclosed herein, the target tracker apparatus uses a visual odometry method such as a ground feature tracking (GFT) method or a global motion vector (GMV) method to optimize and/or otherwise improve the odometry parameters calculated from the Ackermann odometry method. In some examples, the visual odometry method calculates odometry parameters including an egomotion (e.g., a three-dimensional (3-D) motion of an object (e.g., a camera) within an environment), an optical flow field, etc. For example, the target tracker apparatus may correct odometry parameters calculated by the Ackermann odometry method with odometry parameters calculated by the GFT method and/or the GMV method. In another example, the target tracker apparatus may use only odometry parameters determined by the GFT method and/or the GMV method when the vehicle speed is below a speed threshold such as 1 kilometer per hour (kph). For example, vehicle speed data obtained via the CAN bus may be floored to 0 kph for all vehicle speeds less than the speed threshold. In such an example, zeroing the vehicle speed may pose a significant complication to calculating odometry parameters using the odometry method when the vehicle is performing a low-speed vehicle maneuver (e.g., a maneuver including low creep speeds and/or occasional braking) such as driving in a congested area or parking.

In some disclosed examples, the target tracker apparatus determines to use a visual odometry method by characterizing a ground surface (e.g., a road surface, a traveling surface, vehicle surface, etc.) on which a vehicle is traveling. In some examples, the target tracker apparatus characterizes a ground surface by characterizing or determining a ground surface type. For example, the target tracker apparatus may characterize the type of the ground surface as a rocky ground surface (e.g., a surface covered in rocks or similar material), a sandy ground surface (e.g., a surface covered in sand or similar material), an asphalt ground surface (e.g., a surface covered in asphalt or similar material), etc.

In some examples, the target tracker apparatus characterizes the ground surface by characterizing or determining a quality of the ground surface. For example, the target tracker apparatus may characterize a light reflective property of a ground surface. For example, the target tracker apparatus may determine a light reflective property of the ground surface by characterizing the ground surface as exhibiting or possessing a dry quality (e.g., the ground surface is dry), a wet quality (e.g., the ground surface is wet, covered in water or similar liquid, etc.), a snow accumulation quality (e.g., the ground surface is covered in snow), etc. For example, the target tracker apparatus may determine that the ground surface has a low or a reduced light reflective property when the ground surface is dry. A ground surface having a reduced light reflective property may produce improved visual odometry results by using a GFT method compared to a GMV method. In another example, the target tracker apparatus may determine that the ground surface has a high or an increased light reflective property when the ground surface is wet or covered in snow compared to when the ground surface is dry. A ground surface having an increased light reflective property may produce improved visual odometry results by using a GMV method compared to a GFT method.

In some examples, the target tracker apparatus determines a visual odometry method based on a characterization of the ground surface (e.g., a surface type, a surface quality, etc., of the ground surface). For example, the target tracker apparatus may determine to use a GFT method when the vehicle is traveling on an asphalt or similar material surface. In another example, the target tracker apparatus may determine to use a GMV method when the ground surface is wet. In yet another example, the target tracker apparatus may determine to use a GFT method when the vehicle is traveling on a dry asphalt or similar dry material surface.

In some examples disclosed herein, the target tracker apparatus calculates odometry parameters based on one or more weight factors (e.g., method weight factors). For example, the target tracker apparatus may determine to use an Ackermann odometry method and a visual odometry method to calculate an odometry parameter. For example, the target tracker apparatus may determine to fuse the Ackermann odometry data with the visual odometry data. For example, the target tracker apparatus may calculate a method weight factor of 0.6 (e.g., 60%) for the Ackermann odometry data and a method weight factor of 0.4 (e.g., 40%) for the visual odometry data. In such an example, the target tracker apparatus may calculate an odometry parameter for a vehicle that is based 60% in Ackermann odometry data and 40% visual odometry data.

In some examples, the target tracker apparatus generates a vehicle command (e.g., a vehicle maneuver command) based on the calculated odometry parameter. For example, the target tracker apparatus may generate a vehicle maneuver command to move a vehicle from a first position to a second position. For example, the vehicle maneuver command may direct a vehicle to turn towards or away from an object, move away from the object, approach the object, etc. In another example, the vehicle maneuver command may direct a vehicle to back up and park in a parking spot. In yet another example, the target tracker apparatus may generate a vehicle maneuver command to change a trajectory, or a course of travel, of the vehicle from a first trajectory to a second trajectory.

FIG. 1A illustrates an example target tracker 100 monitoring a first vehicle 102 approaching a second vehicle 104 while performing an autonomous vehicle maneuver on a ground surface 106. As depicted in FIG. 1A, the first and the second example vehicles 102, 104 are moving in a forward direction with the first vehicle 102 following the second vehicle 104. The first vehicle 102 of FIG. 1A includes four wheels 108. In the illustrated example, the two front wheels 108 are operatively coupled to each other using Ackermann steering geometry. Similarly, the two rear wheels 108 are operatively coupled to each other using Ackermann steering geometry. For example, the front wheels 108 are operatively coupled to each other via a geometric arrangement of linkages in the vehicle steering that allow the front wheels 108 to turn at different respective radii.

In the illustrated example of FIG. 1A, the first vehicle 102 includes a camera system 110 to capture images of the second vehicle 104. In the illustrated example, the camera system 110 is a front-facing camera system. Additionally or alternatively, the first example vehicle 102 may include a backup camera system, a side-facing camera system, etc., and/or a combination thereof. For clarity purposes, while the functions of the example target tracker 100 are described below in connection with a front-facing camera system, the described functionality may apply to a backup camera system, a side-facing camera system, etc., and/or a combination thereof. The camera system 110 of the illustrated example includes a single camera (e.g., a monocular camera). Alternatively, the example camera system 110 may include two or more cameras to produce stereo images of the second vehicle 104.

In the illustrated example of FIG. 1A, the camera system 110 included in the first vehicle 102 is communicatively coupled (via a cable or a wireless connection) to an electronic control unit 112 implementing the target tracker 100. In the illustrated example of FIG. 1A, the camera system 110 is communicatively coupled to the electronic control unit 112 via a network 114. In the illustrated example of FIG. 1A, the network 114 is a bus and/or a computer network. For example, the network 114 may be an automotive control network, an internal controller bus, a vehicle control network, etc. For example, the automotive control network may utilize one or more communication protocols such as controller area network (CAN) bus based protocols (e.g., CAN, CAN flexible data-rate (FD), CAN in Automation (CiA), CANopen, SAE J1939, etc.), IEEE 802.3 based protocols (e.g., Ethernet), etc.

Additionally or alternatively, the network 114 of FIG. 1A may be a network with the capability of being communicatively coupled to the Internet. However, the example network 114 may be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. The example network 114 enables the target tracker 100 to be in communication with a module of the first vehicle 102 such as the camera system 110 and/or computing server or other computing system external to the first vehicle 102 (e.g., an Internet provided weather service, a GPS system, etc.). As used herein, the phrase "in communication," encompasses direct communication and/or indirect communication through one or more intermediary components and does not require direct physical (e.g., wired) communication and/or constant communication, but rather includes selective communication at periodic or aperiodic intervals, as well as one-time events. For example, the phrase "in communication" may include variances such as secure or non-secure communications, compressed or non-compressed communications, etc.

In the illustrated example of FIG. 1A, the target tracker 100 determines one or more odometry parameters as the first vehicle 102 follows and/or otherwise approaches the second vehicle 104 based on at least one of vehicle speed data (e.g., measurements from a sensor 116 such as a wheel speed sensor) or steering wheel angle data (e.g., measurements from the sensor 116 such as a steering wheel angle sensor). The sensor(s) 116 of FIG. 1A represents one or more instruments monitoring a characteristic or a parameter of the first vehicle 102. For example, the sensor(s) 116 may be an accelerometer, a humidity sensor, a light sensor, a moisture sensor, a pressure sensor, a speed sensor (e.g., an engine speed sensor, a wheel speed sensor, etc.), a temperature sensor, etc., or any other sensor. For example, the vehicle sensor information may include measurements obtained from the sensor(s) 116.

In the illustrated example of FIG. 1A, the target tracker 100 determines one or more odometry parameters of the second vehicle 104 with respect to the first vehicle 102 based on a status of an actuator 118. The actuator 118 of FIG. 1A represents one or more actuators performing one or more actions on the first vehicle 102. For example, the actuator 118 may be an anti-lock brake system actuator, a motor, a solenoid, a valve, a windshield wiper actuator, etc., or any other automotive actuator. For example, the target tracker 100 may calculate a change in lateral displacement, longitudinal displacement, etc., of the second vehicle 104 with respect to the first vehicle 102 based on (1) the speed of the first vehicle 102 during a time period using the vehicle speed data and (2) the direction of the first vehicle 102 during the time period using the steering wheel angle data.

FIG. 1B is a plan view of the first example vehicle 102 and the second example vehicle 104 of FIG. 1A. The first vehicle 102 of FIG. 1B is approaching the second vehicle 104 along a displacement vector 120. The displacement vector 120 of FIG. 1B includes (1) a longitudinal displacement vector component 122 along a first axis 124, or a longitudinal axis 124, and (2) a lateral displacement vector component 126 along a second axis 128, or a lateral axis 128. In the illustrated example of FIG. 1B, the first axis 124 is perpendicular to the second axis 128. The longitudinal displacement vector component 122 of FIG. 1B is representative of the longitudinal displacement of the second vehicle 104 with respect to the first vehicle 102. The lateral displacement vector component 126 of FIG. 1B is representative of the lateral displacement of the second vehicle 104 with respect to the first vehicle 102.

As used herein, the term "longitudinal displacement" refers to a change in a position of a first object with respect to a longitudinal axis of a second object. For example, as depicted in FIG. 1B, the first vehicle 102 approaching the second vehicle 104 during a time period creates a longitudinal displacement or a change in a distance between the first vehicle 102 and the second vehicle 104 along the longitudinal axis 124 during the time period. As used herein, the term "lateral displacement" refers to a change in distance perpendicular or an angle less than perpendicular to the longitudinal axis of the second object. For example, as depicted in FIG. 1B, the first vehicle 102 approaching the second vehicle 104 during a time period creates a displacement or a change in a distance between the first vehicle 102 and the second vehicle 104 along the lateral axis 128 during the time period.

Turning back to FIG. 1A, in some examples, the target tracker 100 calculates one or more odometry parameters using a visual odometry method based on images captured by the camera system 110. For example, the target tracker 100 may calculate an odometry parameter such as a lateral displacement, a longitudinal displacement, a pose, etc., of the second vehicle 104 with respect to the first vehicle 102 using a GFT method and/or a GMV method. As used herein, the term "pose" refers to a position and an orientation of an object in a coordinate system (e.g., a 3-D coordinate system). For example, the target tracker 100 may use a GFT method such as a Lucas-Kanade algorithm or a Horn and S chunk algorithm to track salient points on the ground surface 106 using sequential images captured by the camera system 110. In another example, the target tracker 100 may use a GMV method to track all salient points in an image captured by the camera system 110 including the salient points on the ground surface 106 by calculating essential and fundamental matrices.

In the illustrated example of FIG. 1A, the target tracker 100 characterizes the ground surface 106 to determine a visual odometry method to deploy. For example, the target tracker 100 may characterize the ground surface 106 by characterizing a surface type, a surface quality, etc., and/or a combination thereof of the ground surface 106. In the illustrated example of FIG. 1A, the ground surface 106 is asphalt. Additionally or alternatively, the ground surface 106 may be wet. Additionally or alternatively, the ground surface 106 may be covered in rocks, sand, or any other debris or material. In the illustrated example of FIG. 1A, the target tracker 100 characterizes the surface type of the ground surface 106 as a ground surface covered in asphalt and characterizes the surface quality of the ground surface 106 as a dry ground surface. In the illustrated example of FIG. 1A, the target tracker 100 characterizes the ground surface 106 as dry asphalt based on determining the surface type and the surface quality of the ground surface 106. In response to determining that the ground surface 106 is covered in dry asphalt, the example target tracker 100 may determine to use the GFT method.

In the illustrated example of FIG. 1A, the target tracker 100 calculates odometry parameters based on method weight factors. In some examples, a method weight factor represents a percentage of data or a portion of data calculated by a method used to determine an odometry parameter. For example, the target tracker 100 may use a GFT method weight factor of 0.75 and an Ackermann odometry method weight factor of 0.25 to calculate an odometry parameter based on 0.75 GFT odometry data and 0.25 Ackermann odometry data.

In the illustrated example of FIG. 1A, the target tracker 100 determines method weight factors based on at least one of a selected visual odometry method, a vehicle speed, or a characterization of the ground surface 106. For example, the target tracker 100 may (1) determine to use a GFT method, (2) determine that the vehicle speed is greater than 1 kph, and (3) determine that the ground surface is covered in sand (e.g., dry sand, wet sand, etc.) or similar material. In response to the determinations, the example target tracker 100 may calculate an Ackermann odometry method weight factor of 0.5, a GFT method weight factor of 0.5, and a GMV method weight factor of 0. The example target tracker 100 may calculate an odometry parameter based on 0.5 Ackermann odometry data and 0.5 GFT odometry data.

In some examples, the target tracker 100 generates a vehicle command based on determining one or more odometry parameters. For example, the vehicle command may be an instruction to an ECU to perform a vehicle action such as enabling or disabling an actuator (e.g., the actuator 118 of FIG. 1A), generating an alert (e.g., an audible alert, a visual alert on a user interface in the first vehicle 102, etc.), performing an autonomous vehicle function (e.g., an autonomous backing maneuver, an autonomous driving maneuver, etc.). For example, the target tracker 100 may generate and transmit a command to an ECU included in the first vehicle 102 to maintain a specified following distance with respect to the second vehicle 104 without user assistance.

Figure 2:
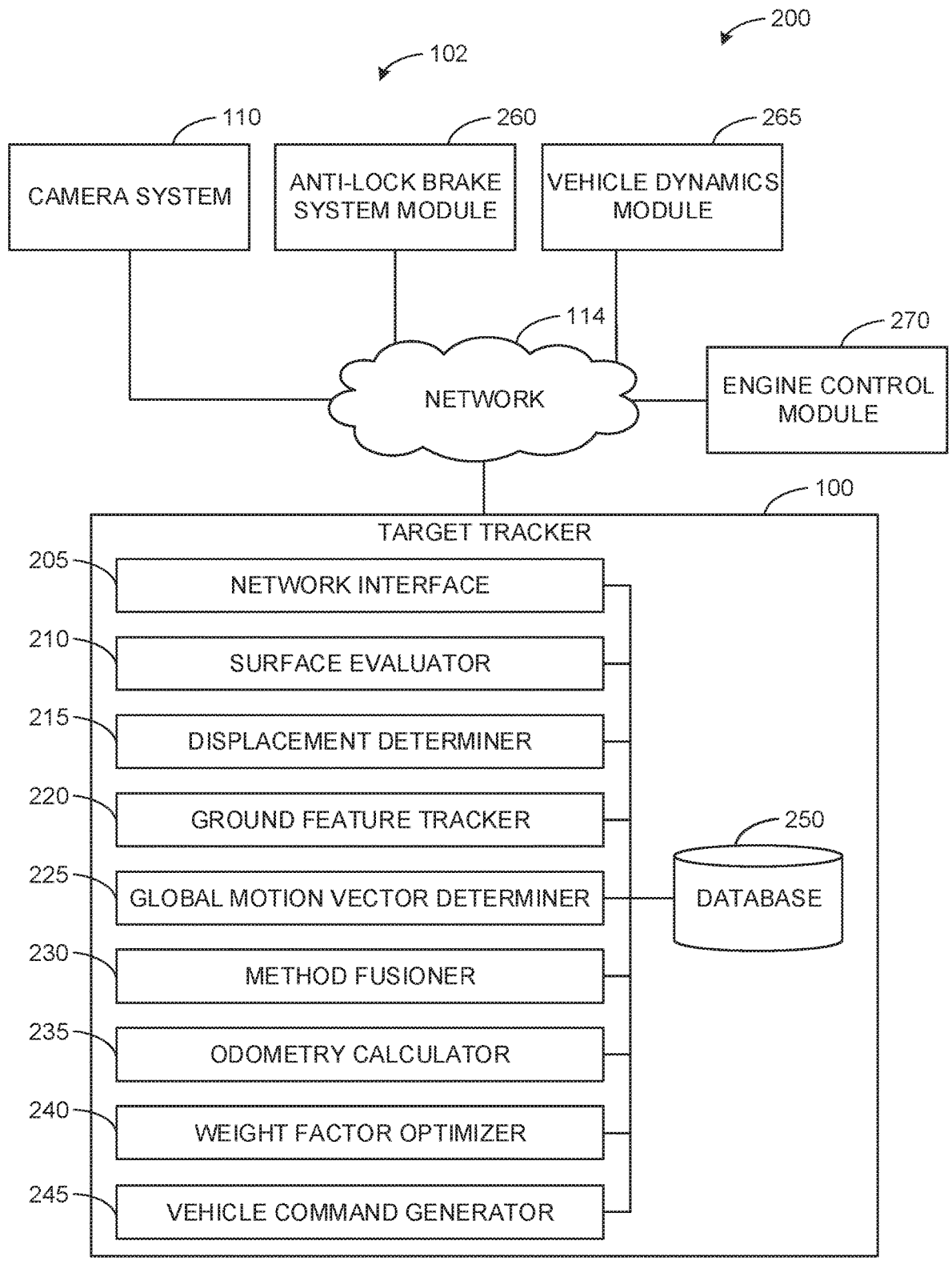
FIG. 2 is a block diagram of an example control system of a vehicle including an example implementation of the example target tracker apparatus of the example vehicle of FIG. 1A that may be used to implement the examples disclosed herein.

FIG. 2 is a block diagram of an example vehicle control system 200 including an example implementation of the example target tracker 100 of the first example vehicle 102 of FIG. 1A that may be used to implement the examples disclosed herein. The example target tracker 100 of FIG. 2 includes an example network interface 205, an example surface evaluator 210, an example displacement determiner 215, an example ground feature tracker 220, an example global motion vector determiner 225, an example method fusioner 230, an example odometry calculator 235, an example weight factor optimizer 240, an example vehicle command generator 245, and an example database 250. The example vehicle control system 200 of FIG. 2 further includes the example camera system 110 of FIG. 1A, the example network 114 of FIG. 1A, an example anti-lock brake system module 260, an example vehicle dynamics module 265, and an example engine control module 270.

In the illustrated example of FIG. 2, the target tracker 100 includes the network interface 205 to obtain information from and/or transmit information to the network 114. Information may include camera system information from the camera system 110, vehicle sensor information from the anti-lock brake system module 260, vehicle sensor information from the vehicle dynamics module 265, vehicle sensor information from the engine control module 270, etc. In the illustrated example, the network interface 205 implements a bus server (e.g., a CAN bus link, a SAE J1939 link, etc.) that receives information from an ECU (e.g., an ECU implementing a corresponding one of the camera system 110, the anti-lock brake system module 260, the vehicle dynamics module 265, the engine control module 270, etc.) or other device communicatively coupled to the network 114 and/or transmits information to the ECU or other device communicatively coupled to the network 114. In the illustrated example, the information is formatted as CAN bus data packets. However, any other data format and/or protocol may additionally or alternatively be used such as, for example, a CANopen protocol, a CiA protocol, a SAE J1939 protocol, a HyperText Transfer Protocol (HTTP), an HTTP secure (HTTPS) protocol, a simple message transfer protocol (SMTP), etc.

In the illustrated example of FIG. 2, the target tracker 100 includes the surface evaluator 210 to characterize the ground surface 106 of FIG. 1A. For example, the surface evaluator 210 may characterize a surface type, a surface quality, etc., of the ground surface 106. In some examples, the surface evaluator 210 characterizes the ground surface 106 based on a sensor measurement. For example, the surface evaluator 210 may determine that the surface quality of the ground surface 106 is wet based on a measurement from a humidity sensor included in the first vehicle 102 of FIG. 1A indicating that there is moisture in the air surrounding the first vehicle 102. In another example, the surface evaluator 210 may determine that the surface type of the ground surface 106 is rocky or covered in rocks or a similar material based on an accelerometer sensor measuring vibrations due to the ground surface 106 being uneven. In yet another example, the surface evaluator 210 may determine that the surface quality of the ground surface 106 is snow covered, snowy, covered in snow, etc., based on a temperature sensor indicating a freezing condition (e.g., an ambient temperature experienced by the first vehicle 102 is below the freezing point of water), windshield wipers (e.g., front windshield wipers, rear windshield wipers, etc.) are enabled, an anti-lock brake system is enabled, etc., and/or a combination thereof. In another example, the surface evaluator 210 may determine that the surface quality of the ground surface 106 is not illuminated (e.g., the first vehicle 102 is traveling at night, the first vehicle 102 is in a tunnel, etc.) based on a measurement from a light sensor.

In some examples, the surface evaluator 210 characterizes the ground surface 106 based on a status of an actuator (e.g., the actuator 118 of FIG. 1A) included in the first vehicle 102. For example, the surface evaluator 210 may determine that the surface quality of the ground surface is wet by determining that the windshield wipers of the first vehicle 102 are activated by determining that the actuator 118 electrically coupled to the windshield wipers is enabled. In another example, the surface evaluator 210 may determine that the actuator 118 electrically coupled to the anti-lock brake system module 260 is enabled due to the first vehicle 102 losing tractive control of the ground surface 106. For example, the surface evaluator 210 may characterize the surface type of the ground surface 106 as covered in sand or a similar material based on a status of one or more components of the anti-lock brake system module 260 (e.g., a status of an anti-lock brake system associated actuator is enabled). In yet another example, the surface evaluator 210 may characterize the surface quality of the ground surface 106 as covered in snow or a similar material based on at least one of (1) determining that the windshield wipers of the first vehicle 102 are activated, (2) that a temperature sensor monitoring the first vehicle 102 indicates a freezing condition, or (3) that the anti-lock brake system or a component associated with the anti-lock brake system is engaged, enabled, etc.

In some examples, the surface evaluator 210 characterizes the ground surface 106 by determining a location of the first vehicle 102. For example, the surface evaluator 210 may characterize the ground surface 106 by accessing the Internet and querying a weather service to evaluate the weather being experienced by a current location of the first vehicle 102. For example, the surface evaluator 210 may characterize the surface quality of the ground surface 106 as wet by obtaining a rain weather report from the Internet weather service for an area in which the first vehicle 102 is located. In another example, the surface evaluator 210 may characterize the surface type of the ground surface as covered in sand or similar material by determining that the first vehicle 102 is located on a beach, in a desert, etc., by querying a GPS system for a location of the first vehicle 102.

In some examples, the surface evaluator 210 characterizes the ground surface by determining a location of the first vehicle 102 and a time of day and/or time of year. For example, the surface evaluator 210 may characterize the ground surface 106 by determining a lighting condition experienced by the ground surface 106 based on a location of the first vehicle 102 and a time of day and/or a time of year. For example, the surface evaluator 210 may determine that the surface quality of the ground surface 106 includes shadows or another visual odometry inhibitive lighting condition by determining that the first vehicle 102 is located in the United States within the state of Maine, the time of year is December, and the time of day is approximately dusk (e.g., 4:00 pm, 4:30 pm, etc.).

Although example surface types of the ground surface 106 described herein include a rocky surface type, a sandy surface type, an asphalt type, etc., additional surface types may be characterized by the example surface evaluator 210 of FIG. 2 and/or, more generally, the example target tracker 100 of FIGS. 1A and/or 2. Although example surface qualities of the ground surface 106 described herein include a dry surface quality, a wet surface quality, a snowy surface quality, a dark (not illuminated) surface quality, an illuminated surface quality, etc., additional surface qualities may be characterized by the example surface evaluator 210 of FIG. 2 and/or, more generally, the example target tracker 100 of FIGS. 1A and/or 2.

In the illustrated example of FIG. 2, the target tracker 100 includes the displacement determiner 215 to determine a change in position of the second vehicle 104 with respect to the first vehicle 102 using Ackermann odometry. For example, the displacement determiner 215 may calculate a displacement of the second vehicle 104 with respect to the first vehicle 102 based on at least one of vehicle speed or steering wheel angle data. For example, the displacement determiner 215 may obtain vehicle speed data and steering wheel angle data from the engine control module 270. In some examples, the displacement determiner 215 integrates vehicle speed data over time and uses Ackermann geometry to calculate lateral displacement, longitudinal displacement, etc., and/or a combination thereof of the second vehicle 104 with respect to the first vehicle 102.

In the illustrated example of FIG. 2, the target tracker 100 includes the ground feature tracker 220 to determine odometry parameters by tracking one or more salient points (e.g., noticeable or prominent features included in a camera image recognized by a ground feature tracking algorithm) on the ground surface 106 based on camera system information obtained from the camera system 110. For example, the ground feature tracker 220 may process a camera image and generate odometry data based on processing the camera image using the GFT method. In some examples, the ground feature tracker 220 tracks a salient point over successive image frames by using an optical flow technique such as the Lucas-Kanade method or the Horn-Schunk method. For example, the ground feature tracker 220 may track a motion of the salient point from image frame to image frame where the motion corresponds to an egomotion of the first vehicle 102 with respect to the second vehicle 104.

In the illustrated example of FIG. 2, the target tracker 100 includes the global motion vector determiner 225 to determine odometry parameters by tracking one or more salient points across an entire image frame including the ground surface 106 based on camera system information obtained from the camera system 110. For example, the global motion vector determiner 225 may process a camera image and generate odometry data based on processing the camera image using the GMV method. In some examples, the global motion vector determiner 225 generates an essential matrix and calculates a pose based on the essential matrix. For example, the global motion vector determiner 225 may identify a point M on the second vehicle 104 that projects onto a first image plane $\overline{m}_1$ in a first image and a second image plane $\overline{m}_2$ in a second image. The point M may be represented by a 4×1 matrix and each of the image planes $\overline{m}_1$ and $\overline{m}_2$ may be represented by a 3×1 matrix. In some examples, $\overline{m}_1$ and $\overline{m}_2$ include normalized coordinates when the camera included in the camera system 110 is calibrated (e.g., $\overline{m}_1$ and $\overline{m}_2$ are given with respect to a coordinate frame of the camera).

Using normalized coordinates, the global motion vector determiner 225 of FIG. 2 can generate an epipolar constraint representing that a first vector from a first optical center of a first imaged point on the second vehicle 104 in the first image to the camera, a second vector from a second optical center of a second imaged point on the second vehicle 104 in the second image to the camera, and a third vector from the first optical center to the second optical center are all coplanar. In normalized coordinates, the global motion vector determiner 225 may express the epipolar constraint as described below in Equation (1):

$$\overline{m}_2^T(t \times R\overline{m}_1) = 0 \qquad \text{Equation (1)}$$

In the illustrated example of Equation (1) above, R represents the rotation and t represents the translation between the coordinate frames of the first and the second imaged points. For example, the multiplication by R transforms $\overline{m}_1$ into the coordinate frame of the second image point. By defining $[t]_x$ as a matrix such that $[t]_x y = t \times y$ for any vector y, the global motion vector determiner 225 may express Equation (1) as Equation (2) as described below:

$$\overline{m}_2^T([t]_x R\overline{m}_1) = \overline{m}_2^T E\overline{m}_1 = 0 \qquad \text{Equation (2)}$$

In the illustrated example of Equation (2), E is the essential matrix and is defined as $E=[t]_x R$. In the illustrated example of Equation (2), the global motion vector determiner 225 determines the essential matrix. For example, the global motion vector determiner 225 may determine the relative position and orientation of the first and the second image points on the second vehicle 104 with respect to the camera included in the camera system 110 of the first vehicle 102 by determining the essential matrix. For example, the global motion vector determiner 225 may calculate one or more odometry parameters corresponding to the first and the second image points on the second vehicle 104 by determining the essential matrix.

In the illustrated example of FIG. 2, the target tracker 100 includes the method fusioner 230 to determine one or more odometry methods to calculate an odometry parameter. In some examples, the method fusioner 230 determines to use the Ackermann odometry method by analyzing a vehicle speed of the first vehicle 102 of FIG. 1A. For example, the method fusioner 230 may determine not to use data generated by the Ackermann odometry method when the vehicle speed is less than a vehicle speed threshold. For example, the method fusioner 230 may determine not to use Ackermann odometry data when a vehicle speed of 0 kph is less than a vehicle speed threshold of 1 kph. For example, the method fusioner 230 may determine to use Ackermann odometry data when the vehicle speed is greater than or equal to 1 kph.

In some examples, the method fusioner 230 determines to use a visual odometry method based on a characterization of the ground surface 106. For example, the method fusioner 230 may select the GFT method, the GMV method, etc., to calculate odometry data based on the ground surface characterization. For example, the method fusioner 230 may determine to use the GMV method when the surface evaluator 210 characterizes the ground surface as wet. For example, the method fusioner 230 may determine that salient points cannot be detected (e.g., reliably detected within a pre-determined detectability tolerance) because of increased light reflectivity from the ground surface 106 due to rain, snow, etc. In another example, the method fusioner 230 may determine to use the GFT method due to a decreased availability in computing resources due to the GMV method being computationally more expensive than the GFT method.

In some examples, the method fusioner 230 determines one or more method weight factors used by the target tracker 100 to calculate an odometry parameter. For example, the method fusioner 230 may determine a method weight factor for an Ackermann odometry method, a GFT method, a GMV method, etc., to be used by the target tracker 100. For example, the method fusioner 230 may fuse data generated by the Ackermann odometry method, the GFT method, the GMV method, etc., and/or a combination thereof.

In some examples, the method fusioner 230 determines a method weight factor based on a vehicle speed. For example, a vehicle speed obtained from the network 114 may be floored to 0 kph if the vehicle speed is less than a vehicle speed threshold (e.g., 1 kph). For example, the target tracker 100 may produce unreliable odometry parameters using the Ackermann odometry method based on a vehicle speed of 0 kph. For example, the method fusioner 230 may prevent data generated by the Ackermann odometry method from being used when the vehicle speed is below the vehicle speed threshold. For example, the method fusioner 230 may compare a vehicle speed to a vehicle speed threshold and determine whether the vehicle speed satisfies the vehicle speed threshold based on the comparison. For example, the method fusioner 230 may compare a vehicle speed of 2 kph to a vehicle speed threshold of 1 kph and determine that the vehicle speed satisfies the vehicle speed threshold based on the comparison. In response to determining that the vehicle speed satisfies the vehicle speed threshold, the method fusioner 230 may determine a non-zero value for the Ackermann odometry method weight factor. In response to determining that the vehicle speed does not satisfy the vehicle speed threshold, the method fusioner 230 may calculate a method weight factor of 0 for the Ackermann odometry method.

In some examples, the method fusioner 230 determines a method weight factor for one or more visual odometry methods based on (1) determining a visual odometry method to calculate an odometry parameter and/or (2) a characterization of the ground surface 106. For example, the method fusioner 230 may calculate an Ackermann method weight factor of 1 and a GFT method weight factor of 0 when the ground surface 106 is wet because the GFT method is highly sensitive to ground reflectivity and may not work well analyzing images of a wet surface. In another example, the method fusioner 230 may calculate an Ackermann method weight factor of 0.5 and a GMV method weight factor of 0.5 when the ground surface 106 is covered in sand or a similar material. For example, the first vehicle 102 may lose tractive control of the ground surface 106 when the ground surface is covered in sand and, thus, the method fusioner 230 may fuse GMV odometry data with Ackermann odometry data to correct for accumulating drift in odometry parameters calculated using the Ackermann odometry method.

In the illustrated example of FIG. 2, the target tracker 100 includes the odometry calculator 235 to calculate an odometry parameter based on data from one or more odometry methods. In some examples, the odometry calculator 235 calculates an odometry parameter based on one or more method weight factors. For example, the odometry calculator 235 may obtain the method weight factors corresponding to the Ackermann odometry method, the GFT odometry method, the GMV odometry method, etc. In some examples, the odometry calculator 235 determines whether to execute an odometry method based on the method weight factor. For example, the odometry calculator 235 may execute the GFT odometry method when the GFT method weight factor is greater than zero. In another example, the odometry calculator 235 may not execute the Ackermann odometry method when the Ackermann method weight factor is zero.

In some examples, the odometry calculator 235 determines an odometry parameter based on executing one or more odometry methods and corresponding method weight factors. For example, the odometry calculator 235 may execute the Ackermann odometry method and the GFT odometry method by determining that the methods weight factors for the Ackermann odometry method and the GFT odometry method are greater than zero. The example odometry calculator 235 may calculate the odometry parameter by fusing the Ackermann odometry data and the GFT odometry data based on the corresponding method weight factors. For example, the odometry calculator 235 may calculate an odometry parameter based on 60% Ackermann odometry data and 40% GFT odometry data by (1) multiplying the Ackermann odometry data by a first method weight factor of 0.6 to determine first odometry data, (2) multiplying the GFT odometry data by a second method weight factor of 0.4 to determine second odometry data, and (3) adding the first and the second odometry data.

In some examples, the odometry calculator 235 calculates an odometry parameter by using a tracking filter. In some examples, the tracking filter is a classical observer, an inverse Jacobian tracking filter, a Kalman filter (e.g., a linear quadratic estimation, an optimal observer, etc.), a least-squares tracking filter etc. For example, the odometry calculator 235 may use a Kalman filter to process a series of measurements (e.g., camera system information, vehicle sensor information, odometry parameters, etc.) observed over time where the measurements include statistical noise and other inaccuracies and produces estimates of unknown variables. In such an example, the odometry calculator 235 generates the estimates by estimating a joint probability distribution over the variables for each timeframe of interest.

In some examples, the odometry calculator 235 determines a noise model (e.g., an additive white Gaussian noise model, a Gaussian-noise model, a Poissonian-Gaussian noise model, etc.) to be used by determining an odometry method to execute or process. For example, the odometry calculator 235 may obtain a method weight factor for an odometry method and determine whether the odometry method is to be processed based on the method weight factor. For example, the odometry calculator 235 may obtain a GFT method weight factor of 0.5 and determine to execute the GFT method by determining that the GFT method weight factor is greater than zero. The example odometry calculator 235 may obtain a noise model corresponding to the GFT method (e.g., a GFT noise model) based on determining that the GFT method is to be processed. In response to obtaining the GFT noise model, the example odometry calculator 235 may execute a Kalman filter to calculate an odometry parameter estimate based on an odometry parameter calculated by the GFT method using the GFT noise model.

In some examples, the odometry calculator 235 determines whether to continue calculating odometry parameters. For example, the odometry calculator 235 may determine to stop calculating odometry parameters when the first vehicle 102 has completed a vehicle action requesting odometry parameters. For example, the odometry calculator 235 may determine that the first vehicle 102 has completed a backing-up vehicle maneuver, the first vehicle 102 has been shut down, etc. In some examples, the odometry calculator 235 determines to continue calculating odometry parameters based on receiving camera system information. For example, the network interface 205 may continue to receive images from a backup camera and cause the odometry calculator 235 to process the images and calculate odometry parameters based on the processed images.

In the illustrated example of FIG. 2, the target tracker 100 includes the weight factor optimizer 240 to optimize and/or otherwise improve estimates of odometry parameters by implementing machine learning techniques such as using a neural network. For example, the weight factor optimizer 240 may use an artificial neural network to progressively improve odometry parameter estimation by learning which information from an Ackermann odometry method, a visual odometry method, etc., is reliable by comparing odometry parameter estimates to actual odometry parameters over time. For example, the weight factor optimizer 240 may fuse the reliable information from each of the available odometry determination methods together to adjust a method weight factor assigned to one or more of the odometry methods. In such an example, the weight factor optimizer 240 may determine that odometry parameters determined by Ackermann odometry are more accurate for longitudinal displacement estimation compared to lateral displacement estimation. The example weight factor optimizer 240 may increase a method weight factor for the Ackermann odometry data when determining a longitudinal displacement and decrease a method weight factor for a visual odometry method when determining a lateral displacement. The example weight factor optimizer 240 may use the artificial neural network to identify such patterns over time and tune one or more method weight factors based on the characterization of the ground surface 106, a current vehicle action being carried out by the first vehicle 102, etc.

In the illustrated example of FIG. 2, the target tracker 100 includes the vehicle command generator 245 to generate a vehicle command based on an odometry parameter calculated by the target tracker 100. In some examples, the vehicle command generator 245 generates a vehicle command instructing one or more ECUs included in the first vehicle 102 to execute a vehicle action such as perform an autonomous driving maneuver (e.g., driving forward along a road surface, making a turn, etc.), an autonomous backing maneuver (e.g., backing up towards a target object without user input), enabling an actuator (e.g., the actuator 118 of FIG. 1A), decreasing a vehicle speed, etc. For example, the vehicle command generator 245 may generate a vehicle command instructing the engine control module 270 to reduce a vehicle speed when a distance between the first vehicle 102 and the second vehicle 104 is decreasing. The example vehicle command generator 245 may generate the vehicle command to reduce the vehicle speed based on identifying that the first vehicle 102 is getting closer (e.g., a specified following distance is not being maintained) to the second vehicle 104 by calculating and analyzing an odometry parameter determined by the target tracker 100.

In some examples, the vehicle command generator 245 generates a vehicle command directing the first vehicle 102 to move from a first position to a second position. Additionally or alternatively, in some examples, the vehicle command generator 245 generates a vehicle command to change a trajectory or a course of travel of the first vehicle 102 from a first trajectory to a second trajectory. For example, the vehicle command generator 245 may generate a vehicle command directing the first vehicle 102 to move from a first position at a first distance from the second vehicle 104 to a second position at a second distance from the second vehicle 104 where the second distance is greater than the first distance (e.g., the first vehicle 102 is directed to increase a following distance with respect to the second vehicle 104). In another example, the vehicle command generator 245 may generate a vehicle command directing the first vehicle 102 to change a path or a trajectory of the first vehicle 102 with respect to the second vehicle 104. For example, the vehicle command may instruct the first vehicle 102 to approach the second vehicle 104 at a first angle compared to a second angle previously used by the first vehicle 102 where the first angle is greater than the second angle to avoid coming in contact with the second vehicle 104.

In some examples, the vehicle command generator 245 generates an audible and/or a visible alert, alarm, warning, etc. For example, the vehicle command generator 245 may generate a text-based alert to be displayed on a user interface on one or more displays included in the first vehicle 102 indicating that the first vehicle 102 will make contact with the second vehicle 104, is maintaining a safe following distance, etc., based on a current vehicle action (e.g., a current vehicle speed, a current direction of motion, a current steering wheel angle, etc.) of the first vehicle 102 and the odometry parameters calculated by the target tracker 100.

In the illustrated example of FIG. 2, the example target tracker 100 includes the database 250 to record data (e.g., vehicle sensor information, camera system information, surface characterizations, odometry data, method weight factors, vehicle commands, etc.). The database 250 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 250 may additionally or alternatively be implemented by one or more double data rate (DDR) memories, such as DDR, DDR2, DDR3, DDR4, mobile DDR (mDDR), etc. The database 250 may additionally or alternatively be implemented by one or more mass storage devices such as hard disk drive(s), compact disk drive(s), digital versatile disk drive(s), solid-state disk drive(s), etc. While in the illustrated example the database 250 is illustrated as a single database, the database 250 may be implemented by any number and/or type(s) of databases. Furthermore, the data stored in the database 250 may be in any data format such as, for example, binary data, comma delimited data, tab delimited data, structured query language (SQL) structures, etc.

In the illustrated example of FIG. 2, the vehicle control system 200 includes the anti-lock brake system module 260 to enable the wheels 108 of FIG. 1A to maintain tractive contact with the ground surface 106 according to driver inputs while braking. The anti-lock brake system module 260 prevents the wheels 108 from locking up (e.g., ceasing rotation) to avoid uncontrolled skidding. The anti-lock brake system module 260 of FIG. 2 obtains sensor information from one or more vehicle actuators or sensors (e.g., (e.g., the sensor 116 of FIG. 1A, the actuator 118 of FIG. 1A, etc.) such as a wheel speed sensor, a ride height sensor, an accelerometer, a solenoid, etc. The anti-lock brake system module 260 may process the sensor information.

In the illustrated example of FIG. 2, the vehicle control system 200 includes the vehicle dynamics module 265 to generate movement of the first vehicle 102 in response to inputs provided by the driver, the ground surface 106, external environmental factors such as wind, etc. Example movement of the first vehicle 102 may include a speed, a turn rate, a longitudinal acceleration, etc. The vehicle dynamics module 265 of FIG. 2 may process the inputs by converting, scaling, translating, and/or otherwise processing the inputs into an analog format or a digital format that may be used by the example target tracker 100.

In the illustrated example of FIG. 2, the vehicle control system 200 includes the engine control module 270 to control a motor (e.g., an electric motor) or an internal combustion engine of the first vehicle 102 to ensure optimal powertrain performance. The engine control module 270 of FIG. 2 obtains sensor information from multiple sensors of various types that measure parameters associated with the engine as well as other systems of the first vehicle 102. For example, the engine control module 270 may obtain vehicle sensor information such as vehicle speed, steering wheel angle information, etc. The engine control module 270 of FIG. 2 interprets the information by using multidimensional performance maps (e.g., lookup tables), and controls the engine based on the interpreted information. The example engine control module 270 may process the obtained information by converting, scaling, translating, and/or otherwise processing the obtained information into an analog format or a digital format that may be used by the example target tracker 100.

While an example manner of implementing the example target tracker 100 of FIG. 1A is illustrated in FIG. 2, one or more of the elements, processes, and/or devices illustrated in FIG. 2 may be combined, divided, re-arranged, omitted, eliminated, and/or implemented in any other way. Further, the example network interface 205, the example surface evaluator 210, the example displacement determiner 215, the example ground feature tracker 220, the example global motion vector determiner 225, the example method fusioner 230, the example odometry calculator 235, the example weight factor optimizer 240, the example vehicle command generator 245, and/or, more generally, the example target tracker 100 of FIG. 1A may be implemented by hardware, software, firmware, and/or any combination of hardware, software, and/or firmware. Thus, for example, any of the example network interface 205, the example surface evaluator 210, the example displacement determiner 215, the example ground feature tracker 220, the example global motion vector determiner 225, the example method fusioner 230, the example odometry calculator 235, the example weight factor optimizer 240, the example vehicle command generator 245, and/or, more generally, the example target tracker 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example network interface 205, the example surface evaluator 210, the example displacement determiner 215, the example ground feature tracker 220, the example global motion vector determiner 225, the example method fusioner 230, the example odometry calculator 235, the example weight factor optimizer 240, and/or the example vehicle command generator 245 is/are hereby expressly defined to include a non-transitory computer readable storage device or storage disk such as a memory, a digital versatile disk (DVD), a compact disk (CD), a Blu-ray disk, etc., including the software and/or firmware. Further still, the example target tracker 100 of FIG. 1A may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the example target tracker 100 of FIGS. 1A and/or 2 are shown in FIGS. 3-8. The machine readable instructions may be a program or portion of a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 3-8, many other methods of implementing the example target tracker 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 3:
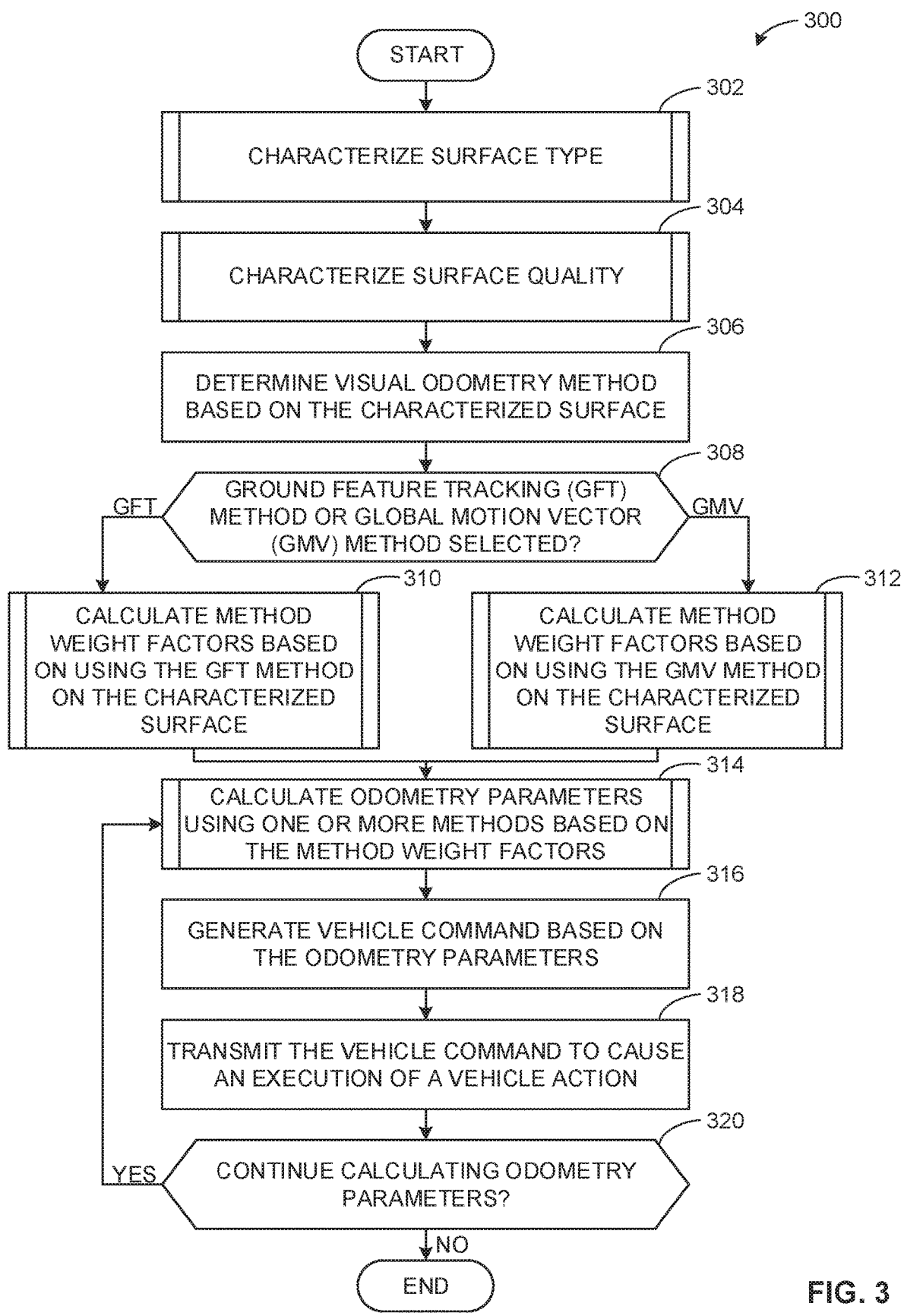
FIG. 3 is a flowchart representative of machine readable instructions which may be executed to calculate odometry parameters based on characterizing a surface.

FIG. 3 is a flowchart representative of an example method 300 that may be performed by the example target tracker 100 of FIGS. 1A and/or 2 to calculate odometry parameters based on a characterization of a ground surface. The example method 300 begins at block 302 when the example target tracker 100 characterizes a surface type. For example, the surface evaluator 210 may characterize the ground surface 106 as uneven (e.g., the ground surface 106 causes a vibration in the first vehicle 102 when in motion, a measurement obtained from an accelerometer indicates an uneven surface, etc.). For example, the surface evaluator 210 may characterize the uneven ground surface as rocky or covered in rocks or a similar material. In another example, the surface evaluator 210 may characterize the surface type of the ground surface as slippery or friction-challenging. For example, the surface evaluator 210 may characterize the slippery ground surface as sandy or covered in sand or a similar material, etc. An example process that can be used to implement block 302 is described below in connection with FIG. 4A.

At block 304, the example target tracker 100 characterizes a surface quality. For example, the surface evaluator 210 may characterize a quality of the ground surface 106 of FIG. 1A based on determining a light reflectivity of the ground surface 106. For example, the surface evaluator 210 may characterize a quality of the ground surface 106 as wet or covered in moisture, snow, etc., based on an increased light reflectivity property of the ground surface 106 compared to a light reflectivity property of the ground surface 106 when the ground surface 106 is dry. An example process that can be used to implement block 304 is described below in connection with FIG. 4B.

At block 306, the example target tracker 100 determines a visual odometry method based on the characterized surface. For example, the method fusioner 230 of FIG. 2 may determine to use a visual odometry method based on the surface evaluator 210 characterizing the surface type and/or the surface quality of the ground surface 106. For example, the method fusioner 230 may determine to use the GMV visual odometry method based on the surface evaluator 210 characterizing the ground surface 106 as wet asphalt.

At block 308, the example target tracker 100 determines whether the ground feature tracking (GFT) method or the global motion vector (GMV) method is selected. For example, the method fusioner 230 may have determined to use the GMV method because the surface evaluator 210 characterized the surface quality of the ground surface 106 as wet or covered in snow.

If, at block 308, the example target tracker 100 determines that the GFT method is selected, then, at block 310, the target tracker 100 calculates method weight factors based on using the GFT method on the characterized surface. For example, the method fusioner 230 may calculate an Ackermann method weight factor of 0.4 and a GFT method weight factor of 0.6 based on determining to use the GFT method on an asphalt surface. An example process that can be used to implement block 310 is described below in connection with FIG. 5.

If, at block 308, the example target tracker 100 determines that the GMV method is selected, control proceeds to block 312 to calculate method weight factors using the GMV method on the characterized surface. For example, the method fusioner 230 may calculate an Ackermann method weight factor of 0.5 and a GMV method weight factor of 0.5 based on determining to use the GMV method on a wet surface. An example process that can be used to implement block 312 is described below in connection with FIG. 6.

At block 314, the example target tracker 100 calculates odometry parameters using one or more methods based on the method weight factors. For example, the odometry calculator 235 may calculate an odometry parameter by combining and/or otherwise fusing data generated by using the Ackermann method and data generated by using the GFT method based on an Ackermann method weight factor of 0.5, a GFT method weight factor of 0.5, and a GMV method weight factor of 0. Some example processes that can be used to implement block 314 are described below in connection with FIGS. 7 and/or 8.

At block 316, the example target tracker 100 generates a vehicle command based on the odometry parameters. For example, the vehicle command generator 245 may generate a vehicle command to instruct the first vehicle 102 to increase a following distance with respect to the second vehicle 104 of FIG. 1A based on the current position of the second vehicle 104 with respect to the first vehicle 102 of FIG. 1A by analyzing the calculated odometry parameters.

At block 318, the example target tracker 100 transmits the vehicle command to cause an execution of a vehicle action. For example, the vehicle command generator 245 may transmit the vehicle command to the engine control module 270 of FIG. 2 to decrease a vehicle speed of the first vehicle 102, increase a steering wheel angle of a steering wheel included in the first vehicle 102, etc.

At block 320, the example target tracker 100 determines whether to continue calculating odometry parameters. For example, the odometry calculator 235 may continue to calculate odometry parameters based on the network interface 205 receiving another camera image or a set of camera images to process. If, at block 320, the example target tracker 100 determines to continue calculating odometry parameters, control returns to block 314 to continue calculating odometry parameters using one or more methods based on the method weight factors, otherwise the example method 300 concludes.

Figure 4A:
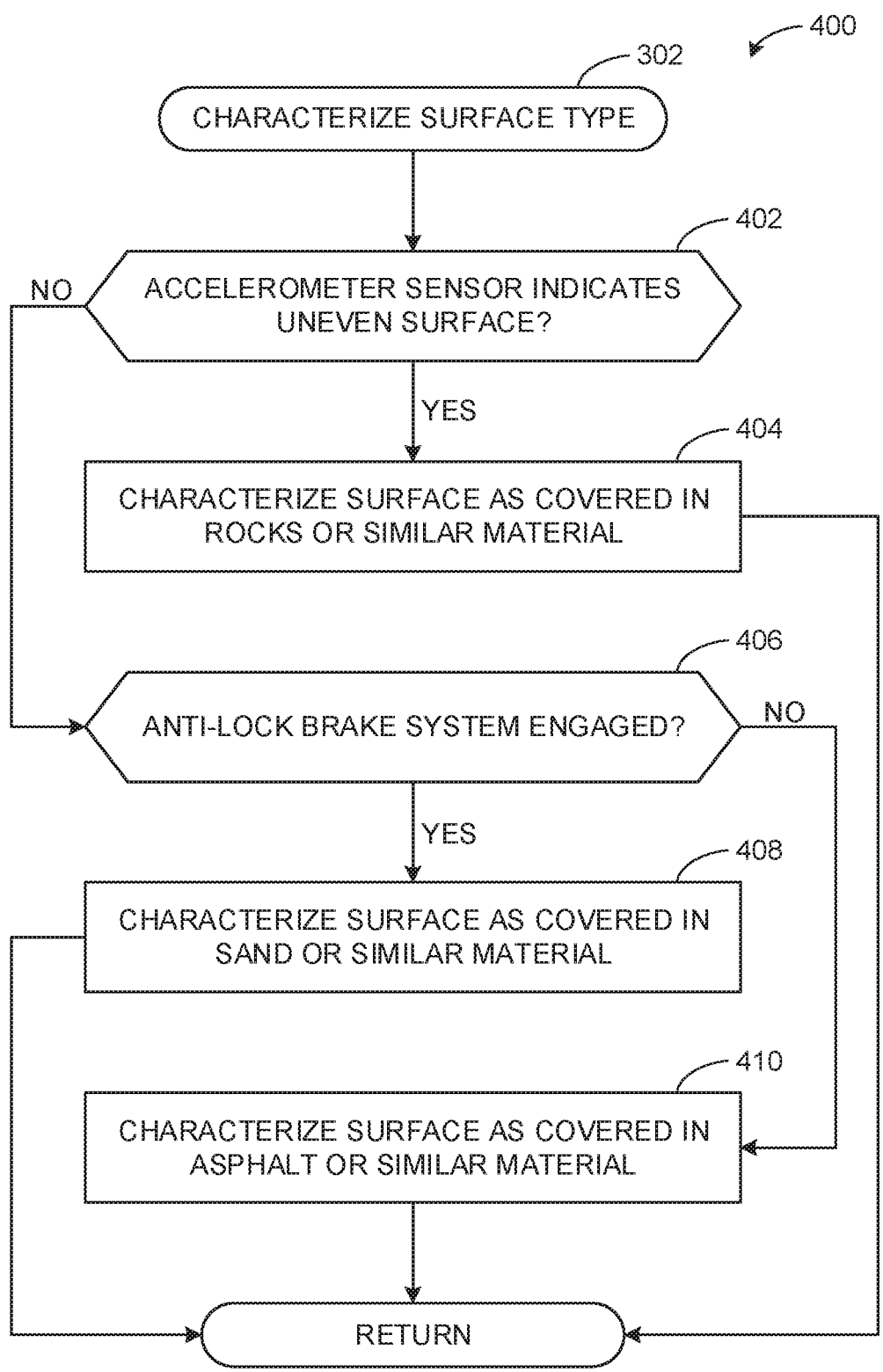
FIG. 4A is a flowchart representative of machine readable instructions which may be executed to characterize a surface type.

FIG. 4A is a flowchart representative of an example method 400 that may be performed by the example target tracker 100 of FIGS. 1A and/or 2 to characterize a surface type. The example process of FIG. 4A can be used to implement the operation of block 302 of FIG. 3.

The example method 400 begins at block 402 when the example target tracker 100 determines whether an accelerometer sensor indicates an uneven surface. For example, the surface evaluator 210 may determine that a measurement from an accelerometer sensor included in the first vehicle 102 indicates that the first vehicle 102 is experiencing vibrations consistent with traveling on an uneven surface such as a surface covered in rocks or a similar material.

If, at block 402, the example target tracker 100 determines that the accelerometer sensor does not indicate an uneven surface, control proceeds to block 406 to determine whether an anti-lock brake system is engaged. If, at block 402, the example target tracker 100 determines that the accelerometer sensor indicates an uneven surface, then, at block 404, the target tracker 100 characterizes the surface as covered in rocks or a similar material. For example, the surface evaluator 210 may characterize the surface type of the ground surface 106 as covered in rocks or a similar material. In response to characterizing the surface as covered in rocks or a similar material, the example method 400 returns to block 304 of the example method 300 of FIG. 3 to characterize a surface quality.

At block 406, the example target tracker 100 determines whether an anti-lock brake system is engaged. For example, the surface evaluator 210 may determine that a status of an anti-lock brake system component such as an actuator, a pressure sensor, etc., indicates that the anti-lock brake system is engaged, which may be representative that the wheels 108 of FIG. 1A are losing tractive control when traveling on a surface covered in sand or a similar material.

If, at block 406, the example target tracker 100 determines that the anti-lock brake system is not engaged, control proceeds to block 410 to characterize the surface as covered in asphalt or a similar material. For example, the target tracker 100 may determine that a lack of an uneven surface, a slippery surface material, etc., and/or a combination thereof indicates that the ground surface 106 is substantially smooth, which may be representative of the ground surface 106 being covered in asphalt, concrete, or other similarly smooth material surfaces. In response to characterizing the surface as covered in asphalt or a similar material, the example method 400 returns to block 304 of the example method 300 of FIG. 3 to characterize a surface quality.

If, at block 406, the example target tracker 100 determines that the anti-lock brake system is engaged, then, at block 408, the target tracker 100 characterizes the surface as covered in sand or a similar material. For example, the surface evaluator 210 may characterize the surface type of the ground surface 106 as covered in sand or a similar material in response to determining that the wheels 108 are losing tractive control based on the anti-lock system being engaged. In response to characterizing the surface as covered in sand or a similar material, the example method 400 returns to block 304 of the example method 300 of FIG. 3 to characterize a surface quality.

Figure 4B:
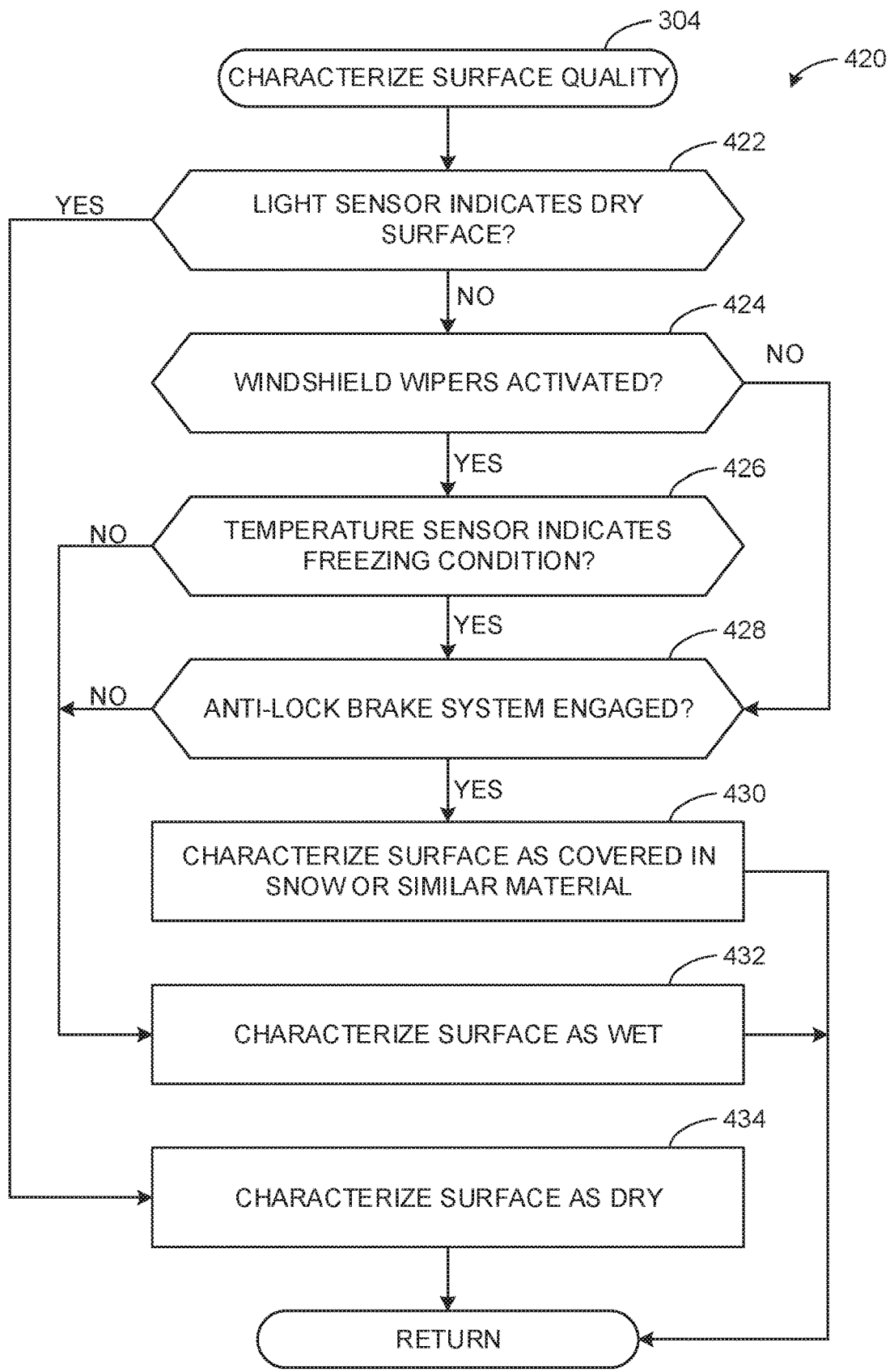
FIG. 4B is a flowchart representative of machine readable instructions which may be executed to characterize a surface quality.

FIG. 4B is a flowchart representative of an example method 420 that may be performed by the example target tracker 100 of FIGS. 1A and/or 2 to characterize a surface quality. The example process of FIG. 4B can be used to implement the operation of block 304 of FIG. 3.

The example method 420 begins at block 422 when the example target tracker 100 determines whether a light sensor indicates a dry surface. For example, the surface evaluator 210 may determine that a measurement from a light sensor included in the first vehicle 102 indicates that the ground surface 106 of FIG. 1A is dry (e.g., the ground surface 106 has a dry surface quality). For example, the surface evaluator 210 may compare the measurement from the light sensor corresponding to the ground surface 106 of FIG. 1A to a light sensor measurement corresponding to a dry ground surface (e.g., a stored light sensor measurement, a reference light sensor measurement, etc., corresponding to a dry ground surface) and determine that the ground surface 106 is dry based on the comparison.

If, at block 422, the example target tracker 100 determines that the light sensor indicates a dry surface, control proceeds to block 434 to characterize the surface as dry. For example, the surface evaluator 210 may characterize the surface quality of the ground surface 106 as dry. In response to characterizing the surface as dry, the example method 420 returns to block 306 of the example method 300 of FIG. 3 to determine a visual odometry method based on the characterized surface.

If, at block 422, the example target tracker 100 determines that the light sensor does not indicate a dry surface, then, at block 424, the target tracker 100 determines whether the windshield wipers are activated. For example, the surface evaluator 210 may determine that a status of an actuator electrically coupled to the windshield wipers is enabled indicating that the first vehicle 102 is experiencing rain and indicating that the surface quality of the ground surface 106 is wet or covered in snow.

If, at block 424, the example target tracker 100 determines that the windshield wipers are not activated, control proceeds to block 428 to determine whether an anti-lock brake system is engaged. If, at block 424, the example target tracker 100 determines that the windshield wipers are activated, then, at block 426, the target tracker 100 determines whether a temperature sensor indicates a freezing condition. For example, the surface evaluator 210 may determine that a measurement obtained from a temperature sensor monitoring the ambient temperature experienced by the first vehicle 102 indicates a freezing condition.

If, at block 426, the example target tracker 100 determines that the temperature sensor does not indicate a freezing condition, control proceeds to block 432 to characterize the surface as wet. For example, the surface evaluator 210 may determine that the surface quality of the ground surface 106 is wet (e.g., covered in water or a similar liquid). If, at block 426, the example target tracker 100 determines that the temperature sensor indicates a freezing condition, then, at block 428, the target tracker 100 determines whether an anti-lock brake system is engaged. For example, the surface evaluator 210 may determine that a status of an anti-lock brake system component such as an actuator, a pressure sensor, etc., indicates that the anti-lock brake system is engaged, which may be representative that the wheels 108 of FIG. 1A are losing tractive control when traveling on a surface covered in snow or a similar material.

If, at block 428, the example target tracker 100 determines that the anti-lock brake system is not engaged, control proceeds to block 432 to characterize the surface as wet. If, at block 428, the example target tracker 100 determines that the anti-lock brake system is engaged, then, at block 430, the target tracker 100 characterizes the surface as covered in snow or a similar material. For example, the surface evaluator 210 may characterize the surface quality of the ground surface 106 as covered in snow. In response to characterizing the surface as covered in snow or a similar material, the example method 400 returns to block 306 of the example method 300 of FIG. 3 to determine a visual odometry method based on the characterized surface.

Figure 5:
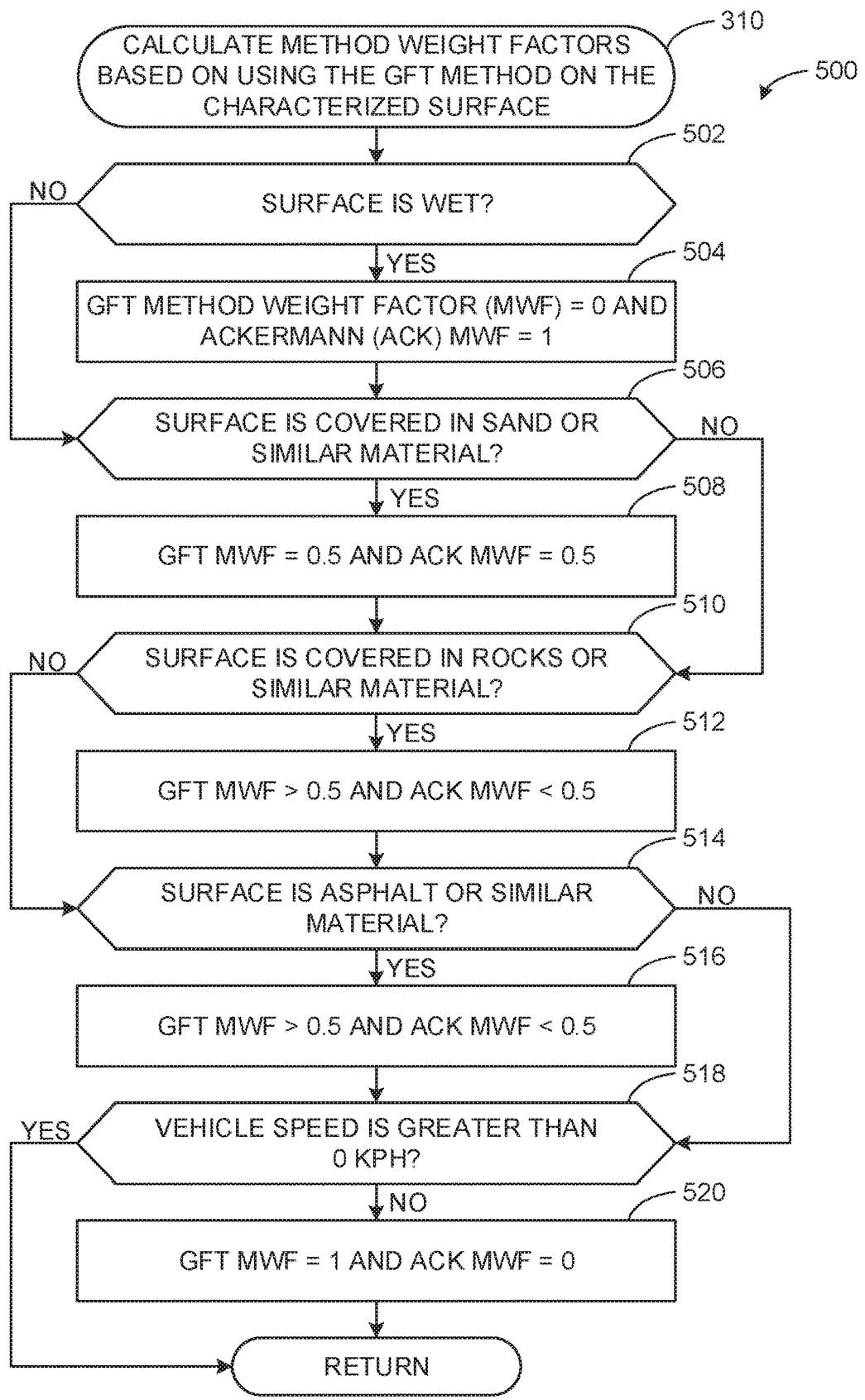
FIG. 5 is a flowchart representative of machine readable instructions which may be executed to calculate method weight factors based on using a ground feature tracking method on a characterized surface.

FIG. 5 is a flowchart representative of an example method 500 that may be performed by the example target tracker 100 of FIGS. 1A and/or 2 to calculate method weight factors based on using the GFT on the characterized surface. The example process of FIG. 5 can be used to implement the operation of block 310 of FIG. 3.

The example method 500 begins at block 502 when the example target tracker 100 determines whether the surface is wet. For example, the method fusioner 230 may determine that the GFT method should not be used when the ground surface 106 is wet (e.g., wet asphalt, wet sand, wet rocks, etc.) due to the GFT method being highly sensitive to light reflectivity from the ground surface 106, which may occur when the ground surface 106 is covered in snow or water.

If, at block 502, the example target tracker 100 determines that the ground surface is not wet, control proceeds to block 506 to determine whether the ground surface is covered in sand or a similar material. If, at block 502, the example target tracker 100 determines that the ground surface is wet, then, at block 504, the target tracker 100 calculates a GFT method weight factor (MWF) of 0 and an Ackermann (ACK) MWF of 1. For example, the method fusioner 230 may calculate a GFT MWF of 0 and an ACK MWF of 1 because the GFT method may not work as accurately as the ACK method and the GFT odometry data should not be fused with the ACK odometry data. Alternatively, the example method fusioner 230 may calculate any other GFT MWF and/or ACK MWF in response to characterizing the ground surface 106 as wet.

At block 506, the example target tracker 100 determines whether the surface is covered in sand or a similar material. For example, the method fusioner 230 may determine that the ACK method generates less accurate data due to the wheels 108 of FIG. 1A losing tractive control and causing vehicle speed errors to accumulate over time when the ground surface 106 is covered in sand (e.g., dry sand, wet sand, etc.) or a similar material. The example method fusioner 230 may improve the accuracy of the ACK odometry data by fusing the ACK odometry data with GFT odometry data.

If, at block 506, the example target tracker 100 determines that the surface is not covered in sand or a similar material, control proceeds to block 510 to determine whether the surface is covered in rocks or a similar material. If, at block 506, the example target tracker 100 determines that the surface is covered in sand or a similar material, then, at block 508, the target tracker 100 calculates a GFT MWF of 0.5 and an ACK MWF of 0.5. For example, the method fusioner 230 may calculate a GFT MWF of 0.5 and an ACK MWF of 0.5 because the ACK method may not generate odometry data that is accurate compared to odometry data generated when the surface is not covered in sand or a similar material. For example, the method fusioner 230 may determine to fuse the ACK odometry data with the GFT odometry data. Alternatively, the example method fusioner 230 may calculate any other GFT MWF and/or ACK MWF in response to characterizing the ground surface 106 as covered in sand or a similar material.

At block 510, the example target tracker 100 determines whether the surface is covered in rocks or a similar material. For example, the method fusioner 230 may determine that the ACK method generates less accurate data due to the wheels 108 of FIG. 1A losing tractive control and causing vehicle speed errors to accumulate over time when the ground surface 106 is covered in rocks (e.g., dry rocks, wet rocks, etc.) or a similar material. The example method fusioner 230 may improve the accuracy of the ACK odometry data by fusing the ACK odometry data with GFT odometry data.

If, at block 510, the example target tracker 100 determines that the surface is not covered in rocks or a similar material, control proceeds to block 514 to determine whether the surface is covered in asphalt or a similar material. If, at block 510, the example target tracker 100 determines that the surface is covered in rocks or a similar material, then, at block 512, the target tracker 100 calculates a GFT MWF greater than 0.5 and an ACK MWF less than 0.5. For example, the method fusioner 230 may calculate a GFT MWF of 0.75 and an ACK MWF of 0.25 because the ACK method may not generate odometry data that is accurate compared to odometry data generated when the surface is not covered in rocks or a similar material. For example, the method fusioner 230 may determine to fuse the ACK odometry data with the GFT odometry data. Alternatively, the example method fusioner 230 may calculate any other GFT MWF and/or ACK MWF in response to characterizing the ground surface 106 as covered in rocks or a similar material.

At block 514, the example target tracker 100 determines whether the surface is covered in asphalt or a similar material. For example, the method fusioner 230 may determine that the ACK method produces less accurate lateral displacement odometry data compared to the GFT method when the ground surface 106 is covered in asphalt or a similar material. The example method fusioner 230 may improve the accuracy of the ACK odometry data by fusing the ACK odometry data with GFT odometry data.

If, at block 514, the example target tracker 100 determines that the surface is not covered in asphalt or a similar material, control proceeds to block 518 to determine whether the vehicle speed is greater than 0 kph. If, at block 514, the example target tracker 100 determines that the surface is covered in asphalt or a similar material, then, at block 516, the target tracker 100 calculates a GFT MWF greater than 0.5 and an ACK MWF less than 0.5. For example, the method fusioner 230 may calculate a GFT MWF of 0.8 and an ACK MWF of 0.2 because the ACK method may not generate lateral displacement odometry data that is accurate compared to the GFT method when the surface is covered in asphalt or a similar material. For example, the method fusioner 230 may determine to fuse the ACK odometry data with the GFT odometry data. Alternatively, the example method fusioner 230 may calculate any other GFT MWF and/or ACK MWF in response to characterizing the ground surface 106 as covered in asphalt or a similar material.

At block 518, the example target tracker 100 determines whether the vehicle speed is greater than 0 kph. For example, the method fusioner 230 may determine that the speed of the first vehicle 102 of FIG. 1A is 0 kph. The example method fusioner 230 may determine to not use ACK odometry data in response to the vehicle speed being floored to zero when the vehicle speed is less than 1 kph.

If, at block 518, the example target tracker 100 determines that the vehicle speed is greater than 0 kph, the example method 500 returns to block 314 of the example method 300 of FIG. 3 to calculate odometry parameters using one or more methods based on the method weight factors.

If, at block 518, the example target tracker 100 determines that the vehicle speed is not greater than 0 kph, then, at block 520, the target tracker 100 calculates a GFT MWF of 1 and an ACK MWF of 0. For example, the method fusioner 230 may adjust the ACK MWF to 0 because the ACK method may produce inaccurate odometry data when the vehicle speed is 0 kph and adjust the GFT MWF to 1 in response to adjusting the ACK MWF to 0. In response to calculating the GFT MWF of 1 and the ACK MWF of 0, the example method 500 returns to block 314 of the example method 300 of FIG. 3 to calculate odometry parameters using one or more methods based on the method weight factors.

Figure 6:
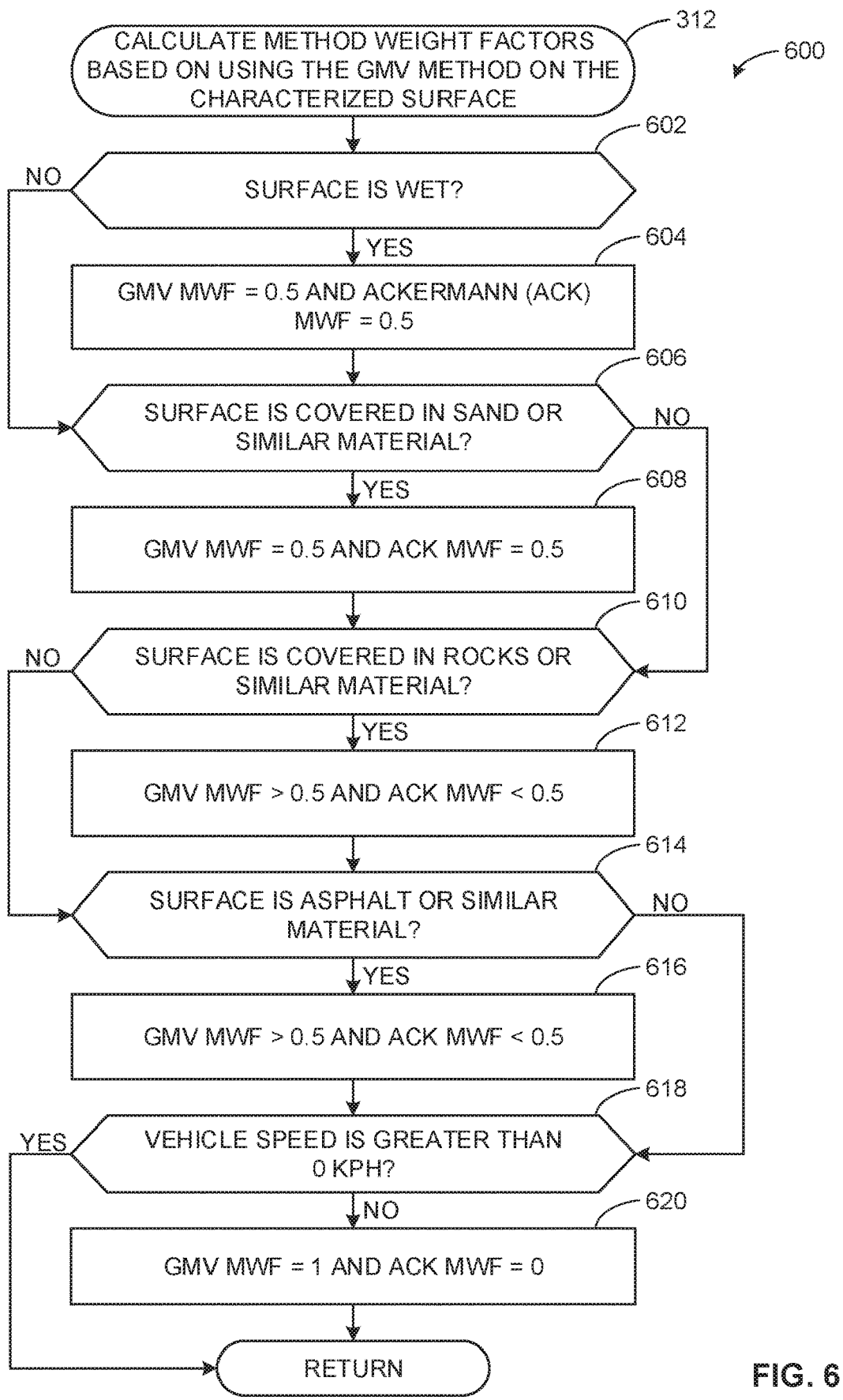
FIG. 6 is a flowchart representative of machine readable instructions which may be executed to calculate method weight factors based on using a global motion vector method on a characterized surface.

FIG. 6 is a flowchart representative of an example method 600 that may be performed by the example target tracker 100 of FIGS. 1A and/or 2 to calculate method weight factors based on using the GMV method on the characterized surface. The example process of FIG. 6 can be used to implement the operation of block 312 of FIG. 3.

The example method 600 begins at block 602 when the example target tracker 100 determines whether the surface is wet. For example, the method fusioner 230 may determine that the ACK method generates less accurate data due to the wheels 108 of FIG. 1A losing tractive control and causing speed errors to accumulate over time when the ground surface 106 is wet (e.g., wet asphalt, wet sand, wet rocks, etc.), covered in snow, etc. The example method fusioner 230 may improve the accuracy of the ACK odometry data by fusing the ACK odometry data with GMV odometry data.

If, at block 602, the example target tracker 100 determines that the ground surface is not wet, control proceeds to block 606 to determine whether the ground surface is covered in sand or a similar material. If, at block 602, the example target tracker 100 determines that the ground surface is wet, then, at block 604, the target tracker 100 calculates a GMV MWF of 0.5 and an ACK MWF of 0.5. For example, the method fusioner 230 may determine that the ACK method generates less accurate data due to the wheels 108 of FIG. 1A losing tractive control and causing vehicle speed errors to accumulate over time when the ground surface 106 is covered in snow, water, etc.

At block 606, the example target tracker 100 determines whether the surface is covered in sand or a similar material. For example, the method fusioner 230 may determine that the ACK method generates less accurate data due to the wheels 108 of FIG. 1A losing tractive control and causing vehicle speed errors to accumulate over time when the ground surface 106 is covered in sand (e.g., dry sand, wet sand, etc.) or a similar material. The example method fusioner 230 may improve the accuracy of the ACK odometry data by fusing the ACK odometry data with GMV odometry data.

If, at block 606, the example target tracker 100 determines that the surface is not covered in sand or a similar material, control proceeds to block 610 to determine whether the surface is covered in rocks or a similar material. If, at block 606, the example target tracker 100 determines that the surface is covered in sand or a similar material, then, at block 608, the target tracker 100 calculates a GMV MWF of 0.5 and an ACK MWF of 0.5. For example, the method fusioner 230 may calculate a GMV MWF of 0.5 and an ACK MWF of 0.5 because the ACK method may not generate odometry data that is accurate compared to odometry data generated when the surface is not covered in sand or a similar material. For example, the method fusioner 230 may determine to fuse the ACK odometry data with the GMV odometry data to improve the accuracy of the ACK odometry data. Alternatively, the example method fusioner 230 may calculate any other GMV MWF and/or ACK MWF in response to characterizing the ground surface 106 as covered in sand or a similar material.

At block 610, the example target tracker 100 determines whether the surface is covered in rocks or a similar material. For example, the method fusioner 230 may determine that the ACK method generates less accurate data due to the wheels 108 of FIG. 1A losing tractive control and causing vehicle speed errors to accumulate over time when the ground surface 106 is covered in rocks (e.g., dry rocks, wet rocks, etc.) or a similar material. The example method fusioner 230 may improve the accuracy of the ACK odometry data by fusing the ACK odometry data with GMV odometry data.

If, at block 610, the example target tracker 100 determines that the surface is not covered in rocks or a similar material, control proceeds to block 614 to determine whether the surface is covered in asphalt or a similar material. If, at block 610, the example target tracker 100 determines that the surface is covered in rocks or a similar material, then, at block 612, the target tracker 100 calculates a GMV MWF greater than 0.5 and an ACK MWF less than 0.5. For example, the method fusioner 230 may calculate a GMV MWF of 0.6 and an ACK MWF of 0.4 because the ACK method may not generate odometry data that is accurate compared to odometry data generated when the surface is not covered in rocks or a similar material. For example, the method fusioner 230 may determine to fuse the ACK odometry data with the GMV odometry data. Alternatively, the example method fusioner 230 may calculate any other GMV MWF and/or ACK MWF in response to characterizing the ground surface 106 as covered in rocks or a similar material.

At block 614, the example target tracker 100 determines whether the surface is covered in asphalt or a similar material. For example, the method fusioner 230 may determine that the ACK method produces less accurate lateral displacement odometry data compared to the GMV method when the ground surface 106 is covered in asphalt (e.g., dry asphalt, wet asphalt, etc.) or a similar material. The example method fusioner 230 may improve the accuracy of the ACK odometry data by fusing the ACK odometry data with GMV odometry data.

If, at block 614, the example target tracker 100 determines that the surface is not covered in asphalt or a similar material, control proceeds to block 618 to determine whether the vehicle speed is greater than 0 kph. If, at block 614, the example target tracker 100 determines that the surface is covered in asphalt or a similar material, then, at block 616, the target tracker 100 calculates a GMV MWF greater than 0.5 and an ACK MWF less than 0.5. For example, the method fusioner 230 may calculate a GMV MWF of 0.7 and an ACK MWF of 0.3 because the ACK method may not generate lateral displacement odometry data that is accurate compared to the GMV method when the surface is covered in asphalt or a similar material. For example, the method fusioner 230 may determine to fuse the ACK odometry data with the GMV odometry data. Alternatively, the example method fusioner 230 may calculate any other GMV MWF and/or ACK MWF in response to characterizing the ground surface 106 as covered in asphalt or a similar material.

At block 618, the example target tracker 100 determines whether the vehicle speed is greater than 0 kph. For example, the method fusioner 230 may determine that the speed of the first vehicle 102 of FIG. 1A is 0 kph. The example method fusioner 230 may determine to not use ACK odometry data in response to the vehicle speed being floored to zero when the vehicle speed is less than 1 kph.

If, at block 618, the example target tracker 100 determines that the vehicle speed is greater than 0 kph, the example method 600 returns to block 314 of the example method 300 of FIG. 3 to calculate odometry parameters using one or more methods based on the method weight factors.

If, at block 618, the example target tracker 100 determines that the vehicle speed is not greater than 0 kph, then, at block 620, the target tracker 100 calculates a GMV MWF of 1 and an ACK MWF of 0. For example, the method fusioner 230 may adjust the ACK MWF to 0 because the ACK method may produce inaccurate odometry data when the vehicle speed is 0 kph and adjust the GMV MWF to 1 in response to adjusting the ACK MWF to 0. In response to calculating the GMV MWF of 1 and the ACK MWF of 0, the example method 600 returns to block 314 of the example method 300 of FIG. 3 to calculate odometry parameters using one or more methods based on the method weight factors.

Figure 7:
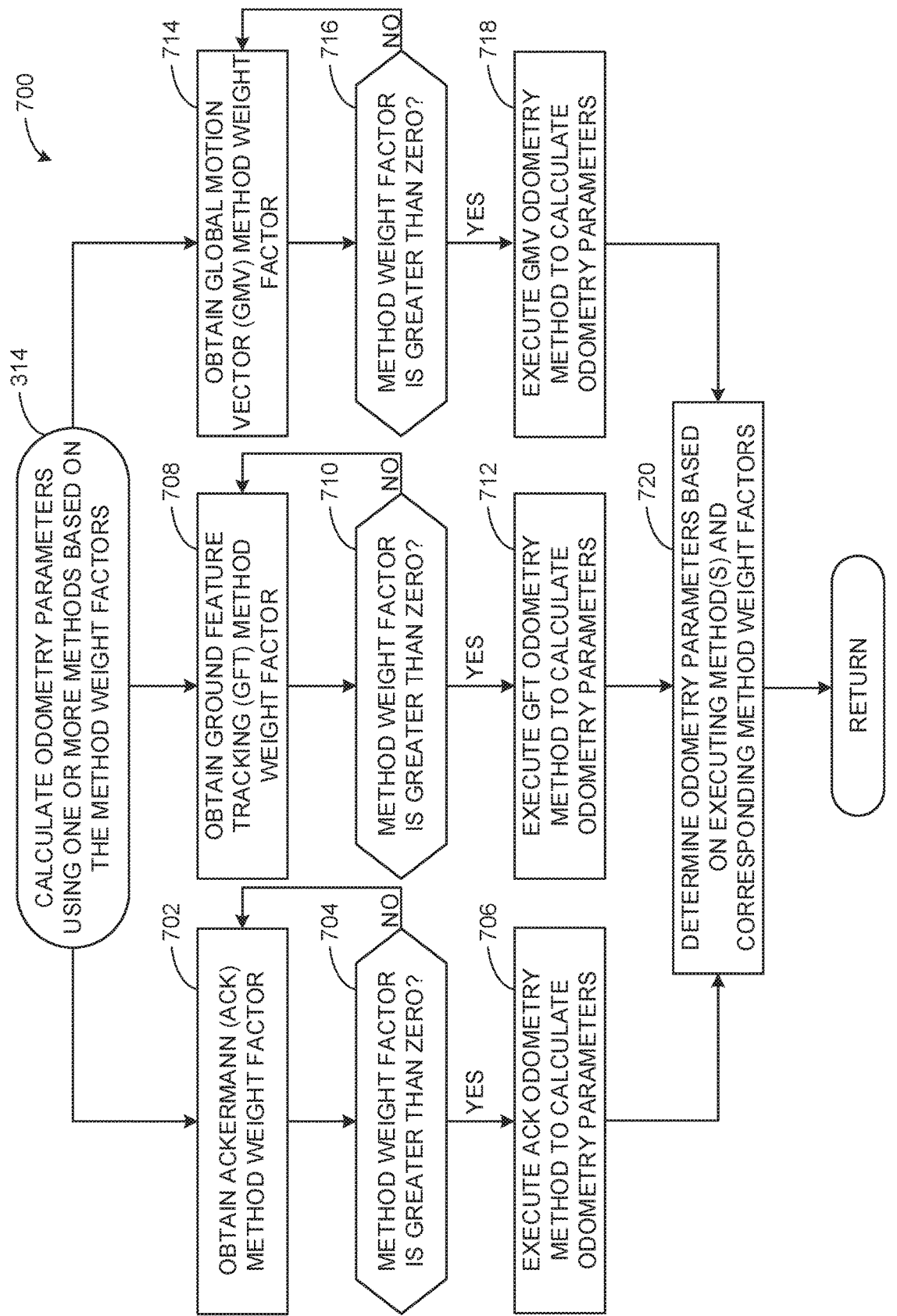
FIG. 7 is a flowchart representative of machine readable instructions which may be executed to calculate odometry parameters using one or more methods based on method weight factors.

FIG. 7 is a flowchart representative of an example method 700 that may be performed by the example target tracker 100 of FIGS. 1A and/or 2 to calculate odometry parameters using one or more methods based on the method weight factors. The example process of FIG. 7 can be used to implement the operation of block 314 of FIG. 3.

The example method 700 begins at blocks 702, 708, and 714 when the example target tracker 100 obtains a method weight factor. At block 702, the example target tracker 100 obtains an ACK method weight factor. For example, the odometry calculator 235 may obtain an ACK method weight factor calculated by the method fusioner 230 as described above in connection with FIGS. 5 and/or 6.

At block 704, the example target tracker 100 determines whether the method weight factor is greater than zero. For example, the odometry calculator 235 may determine that the ACK method weight factor is greater than zero. If, at block 704, the example target tracker 100 determines that the method weight factor is not greater than zero, control returns to block 702 to obtain another ACK method weight factor. If, at block 704, the example target tracker 100 determines that the method weight factor is greater than zero, then, at block 706, the target tracker 100 executes the ACK odometry method to calculate odometry parameters. For example, the odometry calculator 235 may calculate a longitudinal displacement, a lateral displacement, etc., of the second vehicle 104 of FIG. 1A with respect to the first vehicle 102 of FIG. 1A using the ACK odometry method based on vehicle speed information, steering wheel angle information, etc., of the first vehicle 102.

At block 708, the example target tracker 100 obtains a GFT method weight factor. For example, the odometry calculator 235 may obtain a GFT method weight factor calculated by the method fusioner 230 as described above in connection with FIGS. 5 and/or 6.

At block 710, the example target tracker 100 determines whether the method weight factor is greater than zero. For example, the odometry calculator 235 may determine that the GFT method weight factor is greater than zero.

If, at block 710, the example target tracker 100 determines that the method weight factor is not greater than zero, control returns to block 708 to obtain another GFT method weight factor. If, at block 710, the example target tracker 100 determines that the method weight factor is greater than zero, then, at block 712, the target tracker 100 executes the GFT odometry method to calculate odometry parameters. For example, the odometry calculator 235 may calculate a longitudinal displacement, a lateral displacement, etc., of the second vehicle 104 with respect to the first vehicle 102 using the GFT odometry method by tracking salient points on the ground surface 106 using successive camera images captured by the camera system 110 of FIG. 1A.

At block 714, the example target tracker 100 obtains a GMV method weight factor. For example, the odometry calculator 235 may obtain a GMV method weight factor calculated by the method fusioner 230 as described above in connection with FIGS. 5 and/or 6.

At block 716, the example target tracker 100 determines whether the method weight factor is greater than zero. For example, the odometry calculator 235 may determine that the GMV method weight factor is greater than zero.

If, at block 716, the example target tracker 100 determines that the method weight factor is not greater than zero, control returns to block 714 to obtain another GMV method weight factor. If, at block 716, the example target tracker 100 determines that the method weight factor is greater than zero, then, at block 718, the target tracker 100 executes the GMV odometry method to calculate odometry parameters. For example, the odometry calculator 235 may calculate a longitudinal displacement, a lateral displacement, etc., of the second vehicle 104 with respect to the first vehicle 102 using the GMV odometry method by tracking salient points across an entire camera image by generating and using an essential matrix using successive camera images captured by the camera system 110.

At block 720, the example target tracker 100 determines odometry parameters based on executing method(s) and corresponding method weight factors. For example, the odometry calculator 235 may calculate a longitudinal displacement, a lateral displacement, etc., of the second vehicle 104 of FIG. 1A with respect to the first vehicle 102 of FIG. 1A using one or Ackermann odometry methods and/or visual odometry methods. For example, the odometry calculator 235 may calculate an odometry parameter by using only Ackermann odometry data. In another example, the odometry calculator 235 may calculate an odometry parameter by using only GFT odometry data or GMV odometry data.

In yet another example, the odometry calculator 235 may calculate an odometry parameter by fusing Ackermann odometry data with GFT odometry data, GMV odometry data, etc. For example, the odometry calculator 235 may calculate a first odometry parameter using the GFT odometry method. The example odometry calculator 235 may calculate a second odometry parameter using the Ackermann odometry method. The example odometry calculator 235 may calculate a third odometry parameter based on a fusion of the first and the second odometry parameters. For example, the odometry calculator 235 may calculate the third odometry parameter by (1) multiplying the first odometry parameter and the GFT method weight factor, (2) multiplying the second odometry parameter and the Ackermann method weight factor, and (3) calculating a sum of the first and the second odometry parameters to generate the third odometry parameter.

For example, the odometry calculator 235 may calculate an odometry parameter based on 60% Ackermann odometry data and 40% GFT odometry data based on an Ackermann method weight factor of 0.6 and a GFT method weight factor of 0.4. In response to determining odometry parameters based on executing method(s) and corresponding method weight factors, the example method 700 returns to block 316 of the example method 300 of FIG. 3 to generate a vehicle command based on the odometry parameters.

Figure 8:
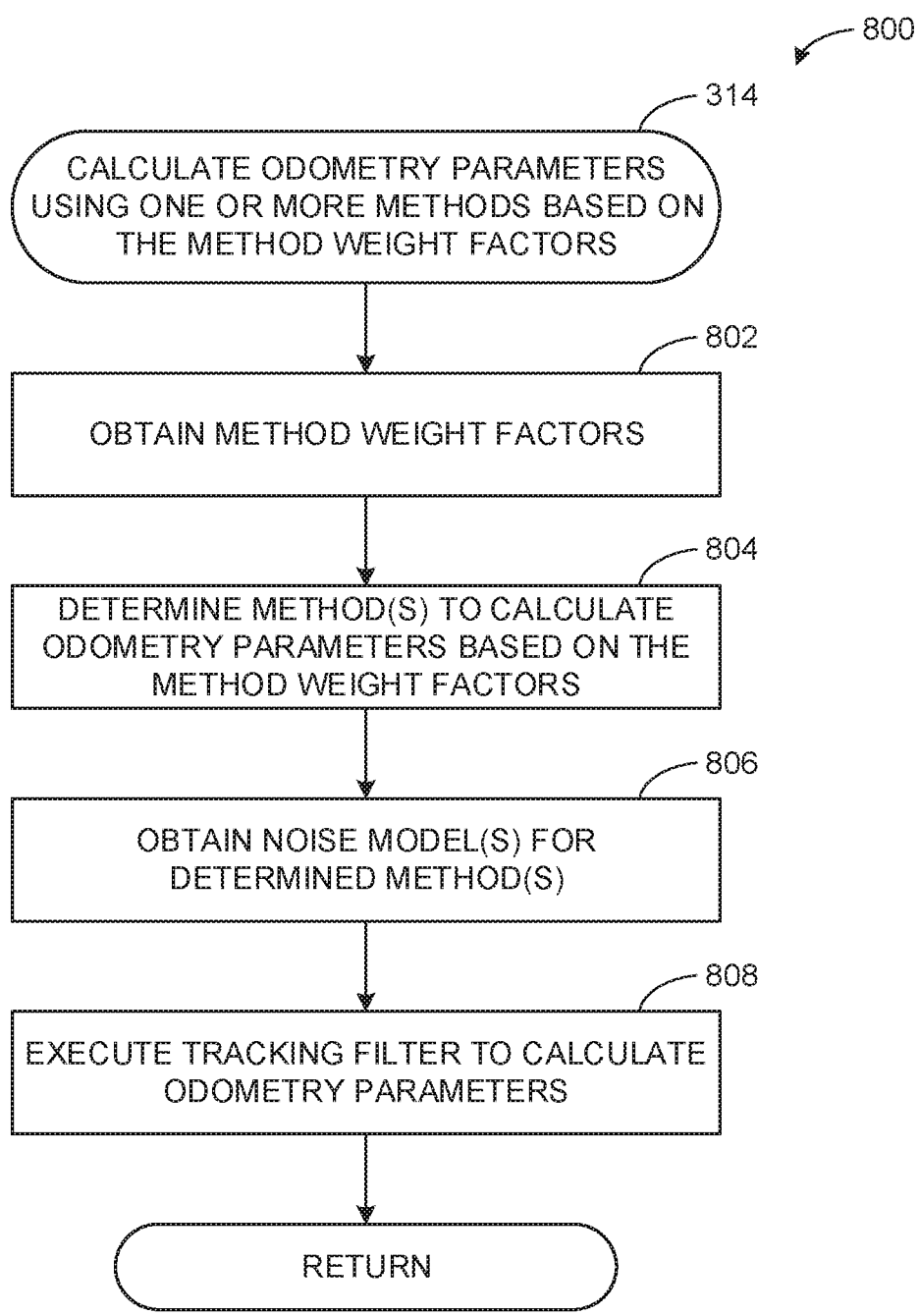
FIG. 8 is another flowchart representative of machine readable instructions which may be executed to calculate odometry parameters using one or more methods based on method weight factors.

FIG. 8 is a flowchart representative of an example method 800 that may be performed by the example target tracker 100 of FIGS. 1A and/or 2 to calculate odometry parameters using one or more methods based on the method weight factors. The example process of FIG. 8 can be used to implement the operation of block 314 of FIG. 3.

The example method 800 begins at block 802 when the example target tracker 100 obtains method weight factors. For example, the odometry calculator 235 may obtain one or more method weight factors calculated by the method fusioner 230 as described above in connection with FIGS. 5 and/or 6. For example, the odometry calculator 235 may obtain an Ackermann method weight factor, a GFT method weight factor, a GMV method weight factor, etc., and/or a combination thereof.

At block 804, the example target tracker 100 determines method(s) to calculate odometry parameters based on the method weight factors. For example, the odometry calculator 235 may determine to use an odometry method based on a non-zero method weight factor. For example, the odometry calculator 235 may determine to use an Ackermann odometry method and a GFT odometry method based on an Ackermann method weight factor of 0.7, a GFT method weight factor of 0.3, and a GMV method weight factor of 0. In another example, the odometry calculator 235 may determine to use a GMV odometry method based on an Ackermann method weight factor of 0, a GFT method weight factor of 0, and a GMV method weight factor of 1.

At block 806, the example target tracker 100 obtains noise model(s) for the determined method(s). For example, the odometry calculator 235 may obtain an Ackermann noise model, a GFT noise model, a GMV noise model, etc., and/or a combination thereof. For example, the odometry calculator 235 may obtain an Ackermann noise model and a GFT noise model in response to determining to use the Ackermann odometry model and the GFT odometry model to calculate odometry parameters.

At block 808, the example target tracker 100 executes a tracking filter to calculate odometry parameters. For example, the odometry calculator 235 may execute a Kalman filter using odometry data generated by the Ackermann odometry method and the GMV odometry method to calculate a longitudinal displacement, a lateral displacement, etc., of the second vehicle 104 of FIG. 1A with respect to the first vehicle 102 of FIG. 1A. In response to executing the tracking filter to calculate the odometry parameters, the example method 800 returns to block 316 of the example method 300 of FIG. 3 to generate a vehicle command based on the odometry parameters.

Figure 9:
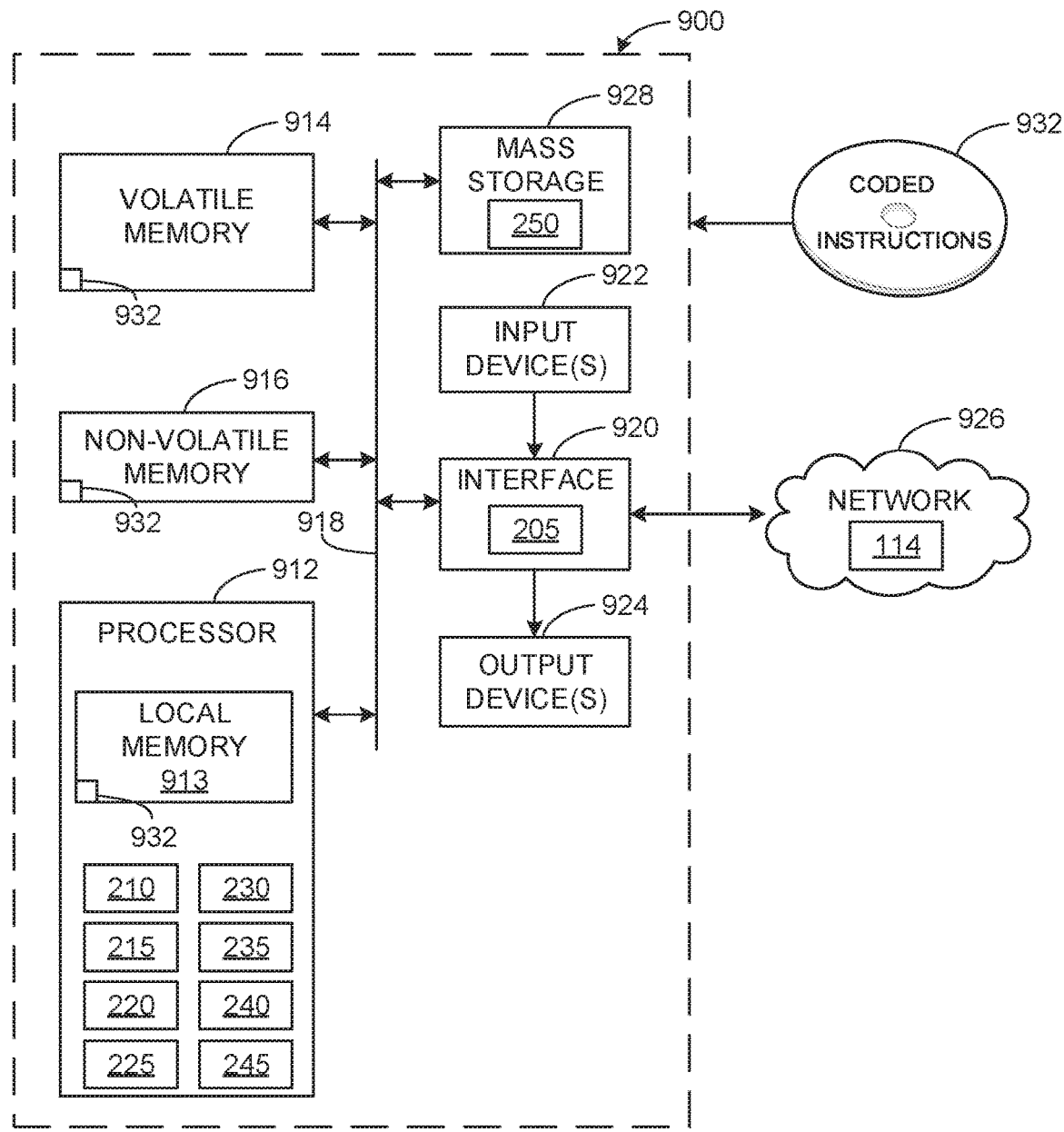
FIG. 9 is a block diagram of an example processing platform structured to execute the instructions of FIGS. 3-8 to implement the example target tracker apparatus of FIGS. 1A and/or 2.

FIG. 9 is a block diagram of an example processor platform 900 capable of executing instructions to implement the methods of FIGS. 3-8 to implement the example target tracker 100 of FIGS. 1A and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example surface evaluator 210, the example displacement determiner 215, the example ground feature tracker 220, the example global motion vector determiner 225, the example method fusioner 230, the example odometry calculator 235, the example weight factor optimizer 240, and the example vehicle command generator 245.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. The interface circuit 920 implements the example network interface 205.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc. The network 926 implements the example network 114.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. The mass storage devices 928 implement the database 250.

The machine executable instructions 932 to implement the methods of FIGS. 3-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that perform visual odometry using a vehicle camera system. Accurate tracking of a target object such as a vehicle to perform autonomous driving maneuvers requires robust estimation of characteristics of the target object such as height, longitudinal distance, lateral distance, etc. Examples disclosed herein improve target characteristic estimation when using a monocular camera to infer depth information typically lacking in such a configuration. Examples disclosed herein correct for accumulated errors when using Ackermann odometry by leveraging information in successive camera image frames using visual odometry methods such as ground feature tracking and global motion vector estimation. Examples disclosed herein determine a visual odometry method to use by characterizing a ground surface being traveled on by a vehicle to minimize and/or otherwise reduce an amount of computing and storage resources needed to calculate odometry data related to a vehicle action. Examples disclosed herein reduces a need for additional hardware such as an additional camera to produce stereo images of the target object and additional computing and storage resources to store and process the stereo images.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a method fusioner to:
      determine a visual odometry method using a surface characterization to calculate first odometry data;
      calculate a first weight factor for the visual odometry method based on the surface characterization; and
      calculate a second weight factor corresponding to an odometry method using sensor information;
   a displacement determiner to calculate second odometry data based on the sensor information;
   an odometry calculator to:
      multiply the first weight factor and the first odometry data to produce a first odometry parameter;
      multiply the second weight factor and the second odometry data to produce a second odometry parameter; and
      calculate a third odometry parameter of a target object with respect to a vehicle based on a fusion of the first odometry parameter and the second odometry parameter; and
   a vehicle command generator to generate a vehicle command based on the third odometry parameter.

2. The apparatus of claim 1, further including a surface evaluator to determine the surface characterization by determining a light reflectivity of a surface on which the vehicle is traveling or whether the surface is uneven.

3. The apparatus of claim 1, wherein the visual odometry method is at least one of a ground feature tracking method or a global motion vector method.

4. The apparatus of claim 1, wherein the third odometry parameter is at least one of a lateral displacement, a longitudinal displacement, or a pose of the target object.

5. The apparatus of claim 1, wherein the sensor information includes at least one of a vehicle speed or a steering wheel angle.

6. The apparatus of claim 1, wherein the vehicle command includes moving the vehicle from a first position to a second position without user input.

7. The apparatus of claim 1, wherein the odometry calculator is to:

obtain a first noise model corresponding to the visual odometry method;
obtain a second noise model corresponding to the odometry method; and
calculate the third odometry parameter by executing a tracking filter using the first and the second noise models.

8. A method comprising:
determining a visual odometry method based on characterizing a surface to calculate first odometry data;
calculating a first weight factor for the visual odometry method based on characterizing the surface;
multiplying the first weight factor and the first odometry data to produce a first odometry parameter;
calculating second odometry data based on sensor information;
calculating a second weight factor corresponding to an odometry method using the sensor information;
multiplying the second weight factor and the second odometry data to produce a second odometry parameter;
calculating a third odometry parameter of a target object with respect to a vehicle based on a fusion of the first odometry parameter and the second odometry parameter; and
generating a vehicle command based on the third odometry parameter.

9. The method of claim 8, wherein characterizing the surface includes determining a light reflectivity of the surface or whether the surface is uneven.

10. The method of claim 8, wherein the visual odometry method is at least one of a ground feature tracking method or a global motion vector method.

11. The method of claim 8, wherein the third odometry parameter is at least one of a lateral displacement, a longitudinal displacement, or a pose of the target object.

12. The method of claim 8, wherein the sensor information includes at least one of a vehicle speed or a steering wheel angle.

13. The method of claim 8, wherein the vehicle command includes moving the vehicle from a first position to a second position without user input.

14. The method of claim 8, further including:
obtaining a first noise model corresponding to the visual odometry method;
obtaining a second noise model corresponding to the odometry method; and
calculating the third odometry parameter by executing a tracking filter using the first and the second noise models.

15. A non-transitory computer readable storage medium comprising instructions which, when executed, cause a machine to at least:
determine a visual odometry method based on characterizing a surface to calculate first odometry data;
calculate a first weight factor for the visual odometry method based on characterizing the surface;
multiply the first weight factor and the first odometry data to produce a first odometry parameter;
calculate second odometry data based on sensor information;
calculate a second weight factor corresponding to an odometry method using the sensor information;
multiply the second weight factor and the second odometry data to produce a second odometry parameter;
calculate a third odometry parameter of a target object with respect to a vehicle based on a fusion of the first odometry parameter and the second odometry parameter; and
generate a vehicle command based on the third odometry parameter.

16. The non-transitory computer readable storage medium of claim 15, wherein the sensor information includes at least one of a vehicle speed or a steering wheel angle.

17. The non-transitory computer readable storage medium of claim 15, wherein the instructions, when executed, cause the machine to:
obtain a first noise model corresponding to the visual odometry method;
obtain a second noise model corresponding to the odometry method; and
calculate the third odometry parameter by executing a tracking filter using the first and the second noise models.

18. An apparatus comprising:
a method fusioner to determine a visual odometry method based on a characterization of a surface to calculate first odometry data;
a displacement determiner to calculate second odometry data based on sensor information;
an odometry calculator to calculate an odometry parameter of a target object with respect to a vehicle based on the first odometry data and the second odometry data by executing a tracking filter using a first noise model corresponding to the visual odometry method and a second noise model corresponding to an odometry method using the sensor information; and
a vehicle command generator to generate a vehicle command based on the odometry parameter.

19. The apparatus of claim 18, wherein the odometry parameter is a third odometry parameter, and wherein:
the method fusioner is to:
calculate a first weight factor for the visual odometry method based on the characterization of the surface; and
calculate a second weight factor corresponding to the odometry method using the sensor information; and
the odometry calculator is to:
multiply the first weight factor and the first odometry data to produce a first odometry parameter;
multiply the second weight factor and the second odometry data to produce a second odometry parameter; and
calculate the third odometry parameter based on a fusion of the first odometry parameter and the second odometry parameter.

20. The apparatus of claim 18, wherein the odometry parameter is at least one of a lateral displacement, a longitudinal displacement, or a pose of the target object.

* * * * *